US010889228B2

(12) United States Patent
Henry et al.

(10) Patent No.: US 10,889,228 B2
(45) Date of Patent: Jan. 12, 2021

(54) TRAILER, LABELING SYSTEM, CONTROL SYSTEM, AND PROGRAM FOR FIELD IMPLEMENTATION OF COMPUTERIZED HOLE SELECTION FOR LAYFLAT IRRIGATION PIPE

(71) Applicant: THE BOARD OF TRUSTEES OF THE UNIVERSITY OF ARKANSAS, Little Rock, AR (US)

(72) Inventors: Christopher G. Henry, Stuttgart, AR (US); Henry Earl Kline, Little Rock, AR (US)

(73) Assignee: THE BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 16/560,107

(22) Filed: Sep. 4, 2019

(65) Prior Publication Data
US 2019/0390793 A1 Dec. 26, 2019

Related U.S. Application Data

(62) Division of application No. 15/628,356, filed on Jun. 20, 2017, now Pat. No. 10,443,760.
(Continued)

(51) Int. Cl.
B60P 3/035 (2006.01)
F16L 1/028 (2006.01)
(Continued)

(52) U.S. Cl.
CPC .............. B60P 3/035 (2013.01); A01G 25/02 (2013.01); A01G 25/09 (2013.01); A01G 25/16 (2013.01);
(Continued)

(58) Field of Classification Search
CPC . E02F 5/102; E02F 5/103; E02F 5/027; E02F 5/101; E02F 5/145; E02F 9/2045;
(Continued)

(56) References Cited

U.S. PATENT DOCUMENTS 1,886,511 A 11/1932 Gledhill
2,453,979 A 11/1948 Frontz
(Continued)

FOREIGN PATENT DOCUMENTS

GB 2211907 A 7/1989

Primary Examiner — Gregory W Adams
(74) Attorney, Agent, or Firm — Michael Best & Friedrich LLP

(57) ABSTRACT

A system for installing and labeling lay flat irrigation pipe in flooded rice and furrow irrigated fields, and a trailer for laying a roll of pipe in an irrigated field. The trailer includes a flexible hitch assembly positioned at a first end of the trailer, wherein the hitch assembly couples the trailer to a vehicle. The trailer also includes a distribution assembly positioned at a second end of the trailer, wherein the distribution assembly includes a spindle and wherein the distribution assembly couples the roll of pipe to the trailer; and a gooseneck frame including a first end coupled to the hitch assembly and a second end coupled to the distribution assembly, with an upper member between the first end and the second end of the gooseneck, wherein the upper member of the gooseneck is elevated relative to the hitch assembly. The trailer may also include offset tandem wheels with a furrow assembly to facilitate the creation of a furrow ditch and for traversing flood irrigated levees for the purposes of installing lay-flat polyethylene pipe for irrigation. The trailer may also include an adjustable telescoping hitch to adjust to various vehicle hitch heights. The system includes a labeling system for indicating the punch size needed along the pipeline during installation. A computerized hole selection plan is developed and transferred to a microprocessor
(Continued)

device, where sensors or a global positioning system is co-locate the device so the punch label can be applied along the pipe during installation.

19 Claims, 28 Drawing Sheets

Related U.S. Application Data

(60) Provisional application No. 62/352,418, filed on Jun. 20, 2016.

(51) Int. Cl.

| | | |
|---|---|---|
| A01G 25/09 | (2006.01) | |
| F16L 1/024 | (2006.01) | |
| E02B 13/00 | (2006.01) | |
| B60P 3/06 | (2006.01) | |
| A01G 25/16 | (2006.01) | |
| A01G 25/02 | (2006.01) | |
| E02F 5/10 | (2006.01) | |

(52) U.S. Cl.
CPC .............. *B60P 3/066* (2013.01); *E02B 13/00* (2013.01); *E02F 5/101* (2013.01); *E02F 5/102* (2013.01); *F16L 1/028* (2013.01); *F16L 1/0243* (2013.01)

(58) Field of Classification Search
CPC . H02G 1/06; F16L 1/032; F16L 1/065; B65H 49/24; B65H 49/32; B65H 57/14; B65H 57/18; B65H 57/26; B65H 2701/33
USPC ............... 137/355.19; 172/310, 441, 455; 242/533.8, 550, 557; 280/404, 441.2, 280/493; 37/367; 405/174, 178, 179, 405/180, 181, 182, 183; 414/458, 460, 414/482, 910, 911
See application file for complete search history.

(56) References Cited

U.S. PATENT DOCUMENTS

| | | | |
|---|---|---|---|
| 2,500,700 A | 3/1950 | Niles | |
| 2,657,938 A | 11/1953 | Browne et al. | |
| 2,867,390 A | 1/1959 | Anrig | |
| 3,083,542 A | 4/1963 | Summers et al. | |
| 3,180,290 A | 4/1965 | Kappelmann et al. | |
| 3,400,542 A | 9/1968 | Davis | |
| 3,486,344 A | 12/1969 | Ylinen | |
| 3,511,398 A | 5/1970 | Lyster et al. | |
| 3,538,713 A | 11/1970 | Killoren | |
| 3,631,752 A | 1/1972 | Frantzen | |
| 3,702,062 A | 11/1972 | Olson | |
| 3,747,357 A | 7/1973 | Erickson et al. | |
| 3,941,324 A | 3/1976 | Green | |
| 3,952,810 A | 4/1976 | Ulrich | |
| 4,063,745 A | 12/1977 | Olson | |
| 4,079,593 A | 3/1978 | Flippin | |
| 4,093,082 A | 6/1978 | Goodsell | |
| 4,141,302 A | 2/1979 | Morrison, Jr. et al. | |
| 4,174,809 A | 11/1979 | Arlemark | |
| 4,256,326 A | 3/1981 | Cantrell et al. | |
| 4,283,160 A | 8/1981 | Angle | |
| 4,311,104 A | 1/1982 | Steilen et al. | |
| 4,379,571 A | 4/1983 | Simmons | |
| 4,395,834 A | 8/1983 | Davison | |
| 4,417,530 A | 11/1983 | Kopecky | |
| 4,705,427 A | 11/1987 | Atkins et al. | |
| 4,756,260 A | 7/1988 | Petersen | |
| 4,926,621 A * | 5/1990 | Torras ................... | A01D 75/30 280/494 |
| 5,010,960 A | 4/1991 | Barnes et al. | |
| 5,655,615 A | 8/1997 | Mick | |
| 5,975,804 A | 11/1999 | Bockman | |
| 6,016,986 A | 1/2000 | Wright | |
| 6,050,578 A | 4/2000 | Beck | |
| 6,364,340 B1 | 4/2002 | Taylor | |
| 7,510,205 B2 | 3/2009 | Bellezza Quater et al. | |
| 7,645,094 B2 * | 1/2010 | Krise ................... | B60P 1/6463 414/800 |
| 8,356,563 B2 | 1/2013 | Schaffert et al. | |
| 8,522,461 B2 * | 9/2013 | Kirian ...................... | E02F 5/06 37/352 |
| 8,613,568 B2 * | 12/2013 | Koegler ................. | E21B 7/208 405/174 |
| 2007/0126196 A1 | 6/2007 | Klahn | |
| 2010/0296900 A1 | 11/2010 | Tocher | |
| 2013/0129458 A1 | 5/2013 | Cheney et al. | |
| 2014/0041263 A1 | 2/2014 | Bockman | |
| 2016/0174039 A1 * | 6/2016 | Huang .................... | G01S 11/06 455/456.3 |

* cited by examiner

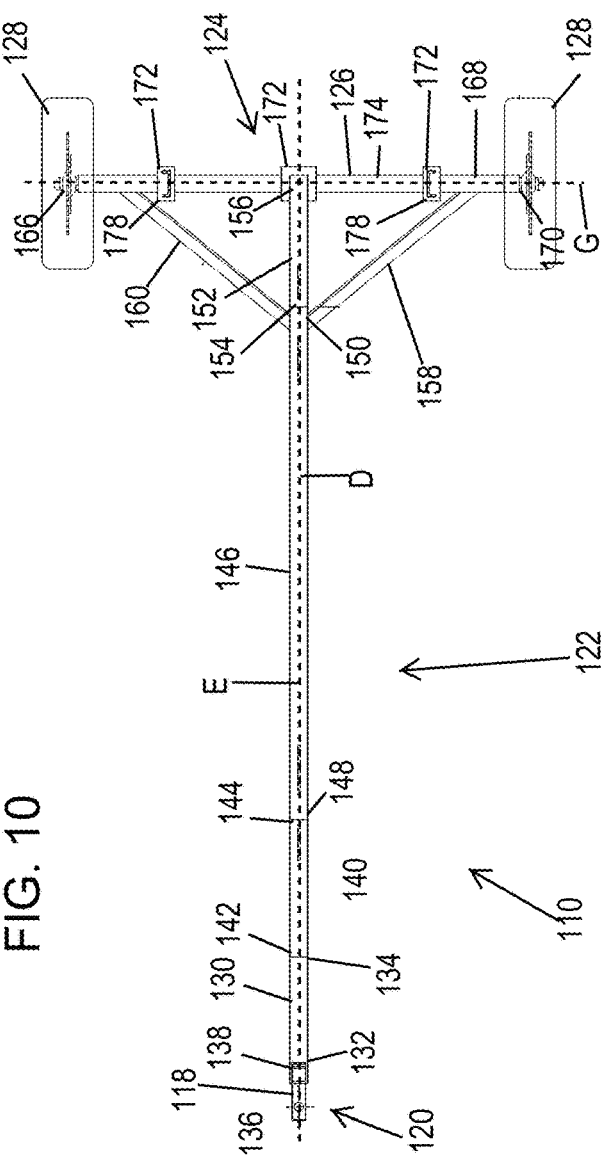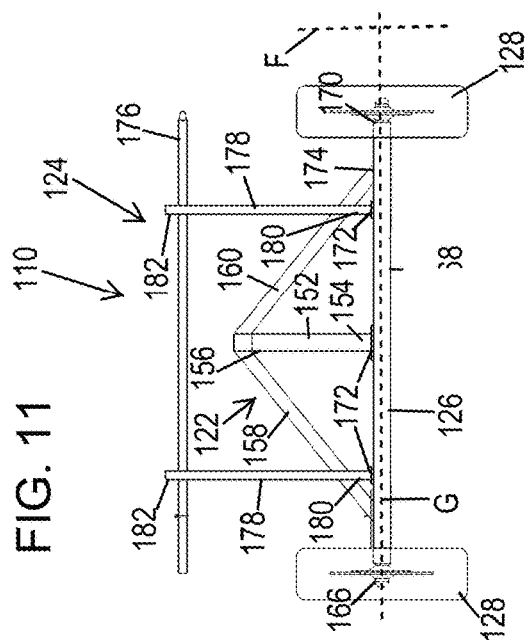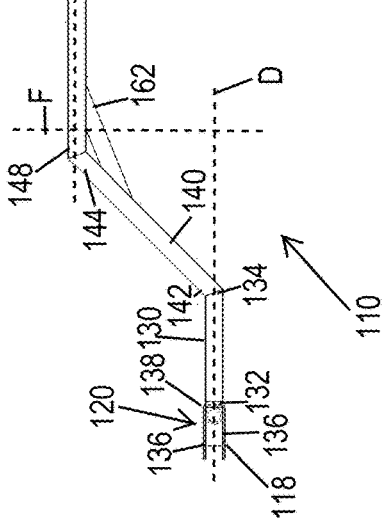

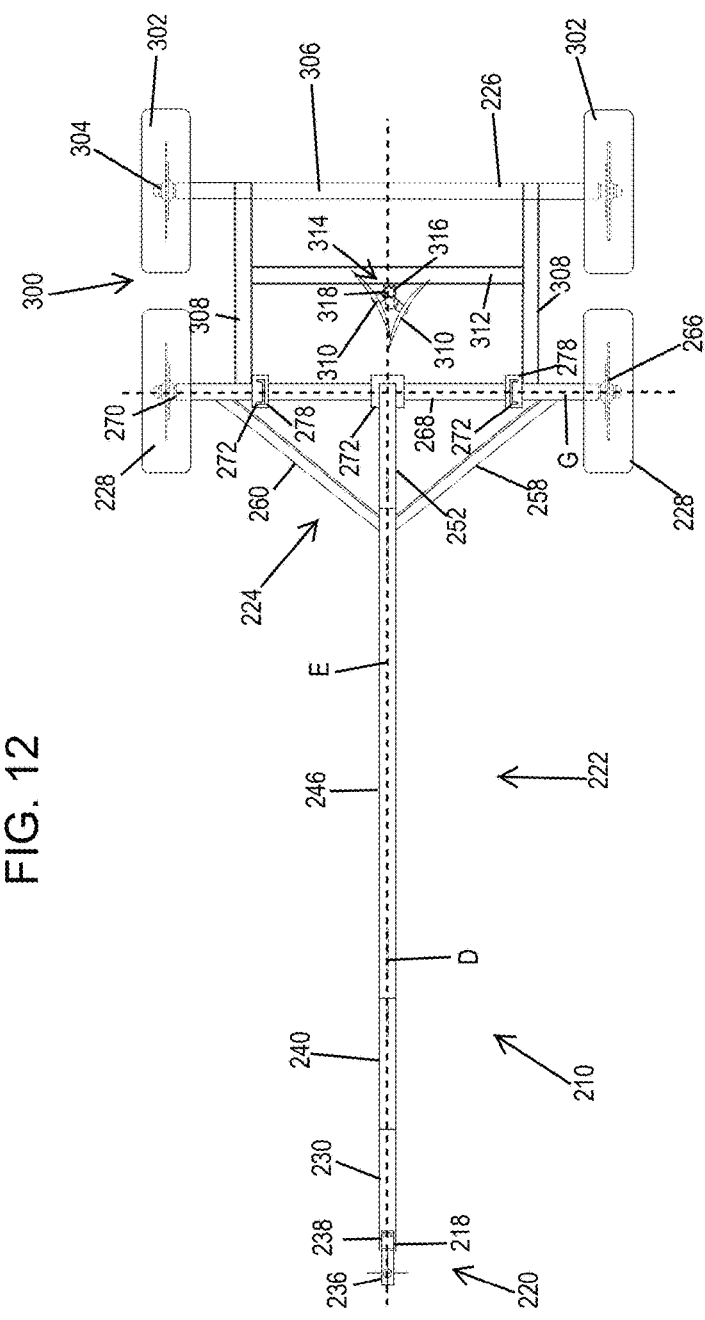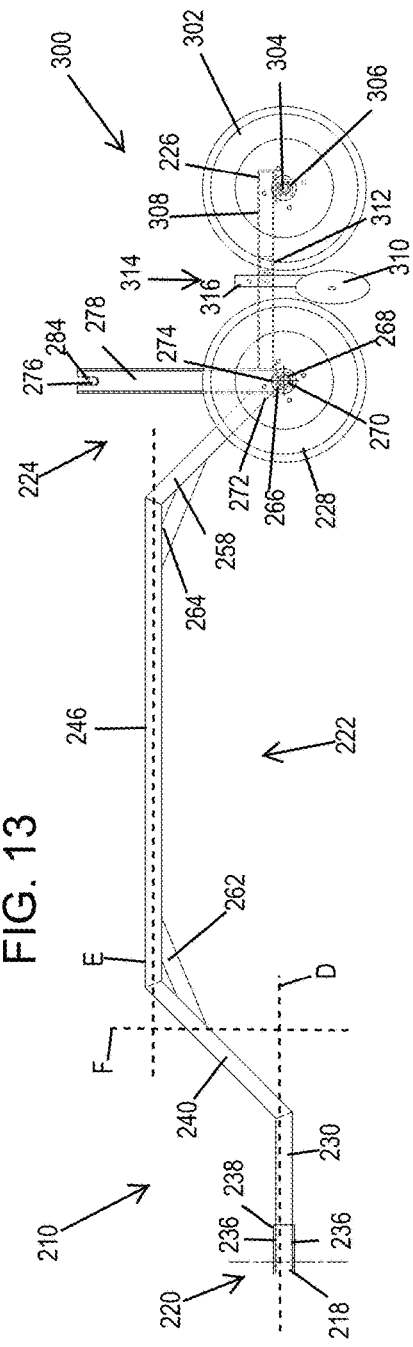

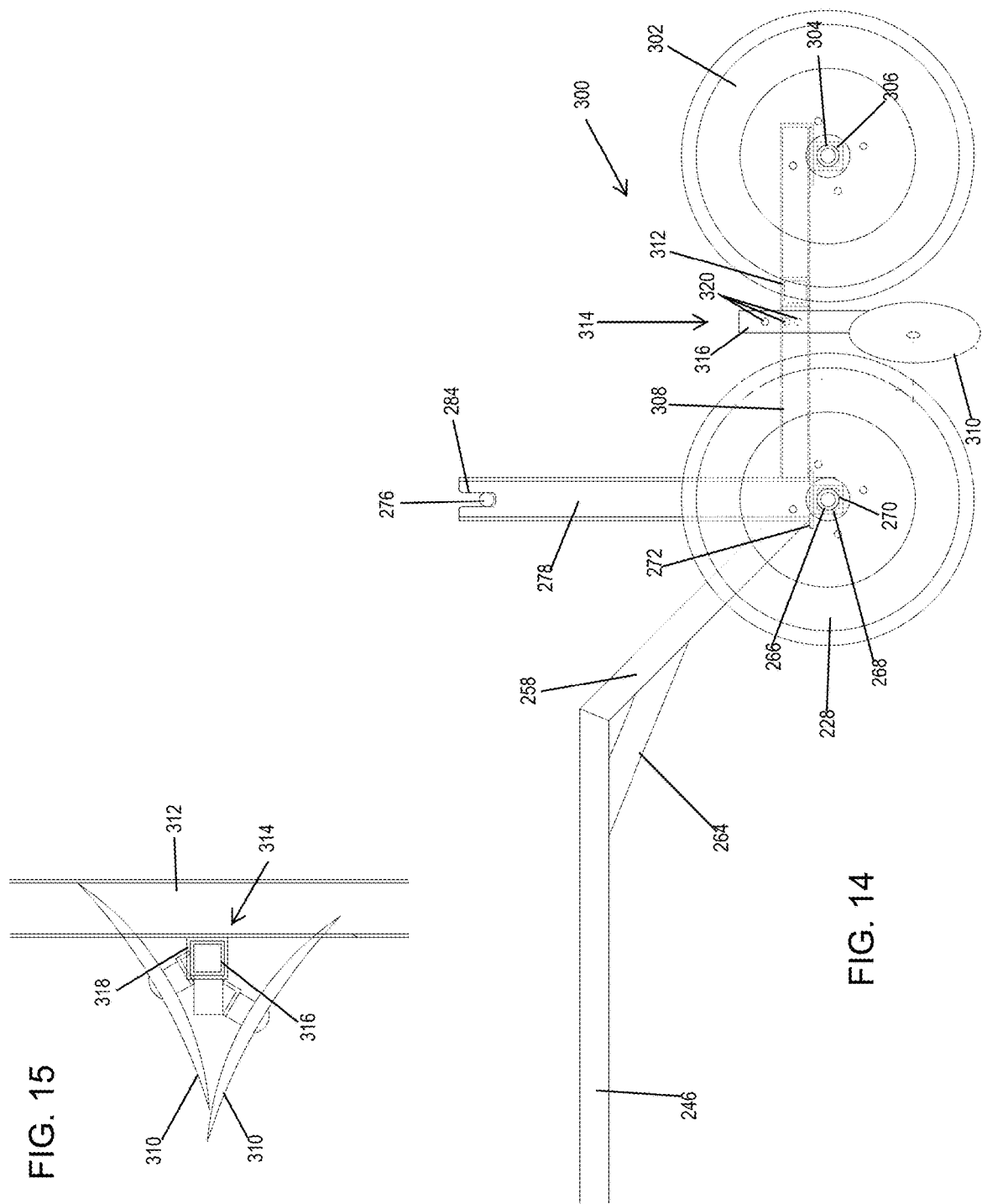

TRAILER, LABELING SYSTEM, CONTROL SYSTEM, AND PROGRAM FOR FIELD IMPLEMENTATION OF COMPUTERIZED HOLE SELECTION FOR LAYFLAT IRRIGATION PIPE

CROSS-REFERENCE TO RELATED APPLICATIONS

This application is a divisional of U.S. application Ser. No. 15/628,356, filed on Jun. 20, 2017, and claims the benefit of U.S. Provisional Patent application No. 62/352,418, filed on Jun. 20, 2016, the contents of each of which being incorporated herein by reference.

FIELD OF THE INVENTION

The present invention relates to a trailer for a vehicle that deploys and labels lay-flat pipe. In particular, the trailer lays polyethylene (PE) lay-flat pipe for multiple inlet rice irrigation (MIRI) or furrow irrigation. For rice field applications, the system includes a trailer configured to be towed by an all-terrain vehicle (ATV) or all-terrain utility vehicle (ATU). For furrow irrigation applications, the trailer can also be used or the labeling system can be attached to a tractor mounted pipe installation toolbar. The invention prints or labels the computerized hole selection (CHS) plan on the pipe as it is installed in the field, so the user can punch the appropriate hole size along the pipe during pipe fill to maximize irrigation efficiency.

BACKGROUND OF THE INVENTION

MIRI involves the use of lay-flat PE pipe to distribute irrigation water across levees in contoured and precision-graded rice fields. MIRI requires laying at least one row of PE lay-flat pipe perpendicular to and over levees of the rice field in order to disperse water between the levees to flood each rice paddy. MIRI can reduce water use by 25% in some studies and has increase yields in others.

CHS is the use of a computer program to design the appropriate number and size of holes to punch in lay flat irrigation pipe. In lay flat pipe, very low pressure (less than 1 meter of pressure) is used and the pipe is very large so that negligible friction loss is experienced. A CHS plan accounts for pipe crown elevation data, flow rate, furrow spacing, and furrow row length. A computer program is used to iterate the proper hole size along the pipe so that water is distributed evenly across the field. This process is used for both furrow irrigation and MIRI. In furrow irrigation, a small hole punch device with sizes ranging from one quarter inch to one inch, with hole sizes for every $1/16$" are used to create the holes in the pipe. Typically, holes are punched in every furrow, typically every 30 to 60 inches. CHS designs can have one hole or up to 10 hole sizes with highly variable spacing across the length of the pipeline. Currently irrigators punch holes based on experience or guess, and this results in more water being applied to some furrows than is needed and reduces the irrigation efficiency. The use of CHS can reduce furrow irrigation application volumes by 20-50%.

There are two types of multiple inlet irrigation: side inlet and multiple inlet. In the multiple inlet type, the pipe is placed in the middle of the field, and a trench must be created to facilitate deploying the pipe. The trench is necessary to ensure the pipe does not roll and it stays in place. In the side inlet type, the formation of the levee creates a furrow or ditch for the pipe to lay in. In side inlet, as the term suggests, the pipe is placed at the side of the field or levee.

Traditional methods of laying PE pipe for MIRI involves large tractors, other heavy machinery, or laying the pipe by hand. However, the large tires and heavy weight of the tractors and heavy machinery can damage rice paddy levees as they travel across the field. The damage to the levees can be difficult and time-consuming to fix. Furthermore, tractors and heavy machinery generally travel much slower than ATVs and other ATUs and can therefore take a significant amount of time to travel between rice fields to lay pipe at separate locations. Laying pipe by hand can also be very time consuming and difficult due to the weight of the rolls of PE pipe.

SUMMARY OF THE INVENTION

The trailers described herein allow for pipe to be deployed by an ATV or ATU or other small low ground pressure vehicle for MIRI. They are able to traverse levees and fields minimizing damage to the levees while carrying the heavy rolls of pipe. This reduces maintenance needs during the season for repairing levees as damage to the levees is a major complaint among farmers with MIRI. Another advantage is that the trailers save labor and time as deployment of the pipe is faster than with a tractor. One of the trailers includes an apparatus to install a small furrow to keep the pipe in place. The trailers are lightweight and much smaller than a tractor mounted device and can be transported in the bed of a pickup or trailer which the ATV and pipe rolls are also moved with between fields.

Currently, MIRI only represents about 25% of rice irrigation, but many barriers to adoption exist. It is generally recognized that MIRI can reduce water use by 25%, and as water policies are developed and producers become more aware of water use, more producers may adopt MIRI that have not done so in the past because of potential regulation. These trailers may help promote the implementation of MIRI for farmers that do not feel they have the time currently to implement MIRI.

In one embodiment, the invention provides a trailer for laying a roll of pipe in a field. The trailer includes a hitch assembly, a distribution assembly, and a gooseneck frame. The hitch assembly is positioned at a first end of the trailer, wherein the hitch assembly couples the trailer to a vehicle. The distribution assembly is connected to a second end of the trailer, wherein the distribution assembly includes a spindle to support the roll of pipe. The gooseneck frame includes a first end connected to the hitch assembly and a second end connected to the distribution assembly, a member between the first end of the gooseneck frame and the second end of the gooseneck frame, and wherein the member is elevated relative to the hitch assembly.

In another embodiment, the invention provides a trailer for laying a roll of pipe in a field. The trailer comprises a first member including a first end and a second end, a second member connected to the second end of the first member and oriented at an angle of about 135 degrees relative to the first member, and a third member connected to the second member and oriented at an angle of about 135 degrees relative to the second member. The trailer also comprises a cross bar connected to the third member and oriented perpendicular to the third member, a first axle coupled to the cross bar, the first axle supporting a pair of wheels, a hitch assembly coupled to the first end of the first member, the hitch assembly coupleable to a vehicle, and a first arm and a second arm coupled to the cross bar and extending upward from the cross bar, the first arm and the second arm configured to support a spindle supporting a roll of pipe.

In yet another embodiment, the invention provides a printed punch plan system. The system comprises an electronic processor configured to receive a computerized hole selection plan, a printer, and a global positioning system coupled to the printer to locate the printer relative to a field, the printer in communication with the electronic processor and configured to receive instructions for printing information on lay flat pipe based on the computerized hole selection plan and where the printer is located.

BRIEF DESCRIPTION OF THE DRAWINGS

FIG. 9 is side view of the trailer illustrated in FIG. 6.

FIG. 10 is a top view of the trailer illustrated in FIG. 6.

FIG. 11 is a rear view of the trailer of FIG. 6.

FIG. 12 is a top view of a trailer according to another embodiment of the present invention.

FIG. 13 is a side view of the trailer illustrated in FIG. 12.

FIG. 14 is a side view of a furrow assembly of the trailer illustrated in FIG. 12.

FIG. 15 is a top view of the furrow assembly illustrated in FIG. 14.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more electronic processors. As such, it should be noted that a plurality of hardware and software based devices, as well as a plurality of different structural components may be utilized to implement the invention. For example, "controller" and "control unit" described in the specification can include one or more electronic processors, one or more memory modules including non-transitory computer-readable medium, one or more input/output interfaces, and various connections (e.g., a system bus) connecting the components.

Figure 1:
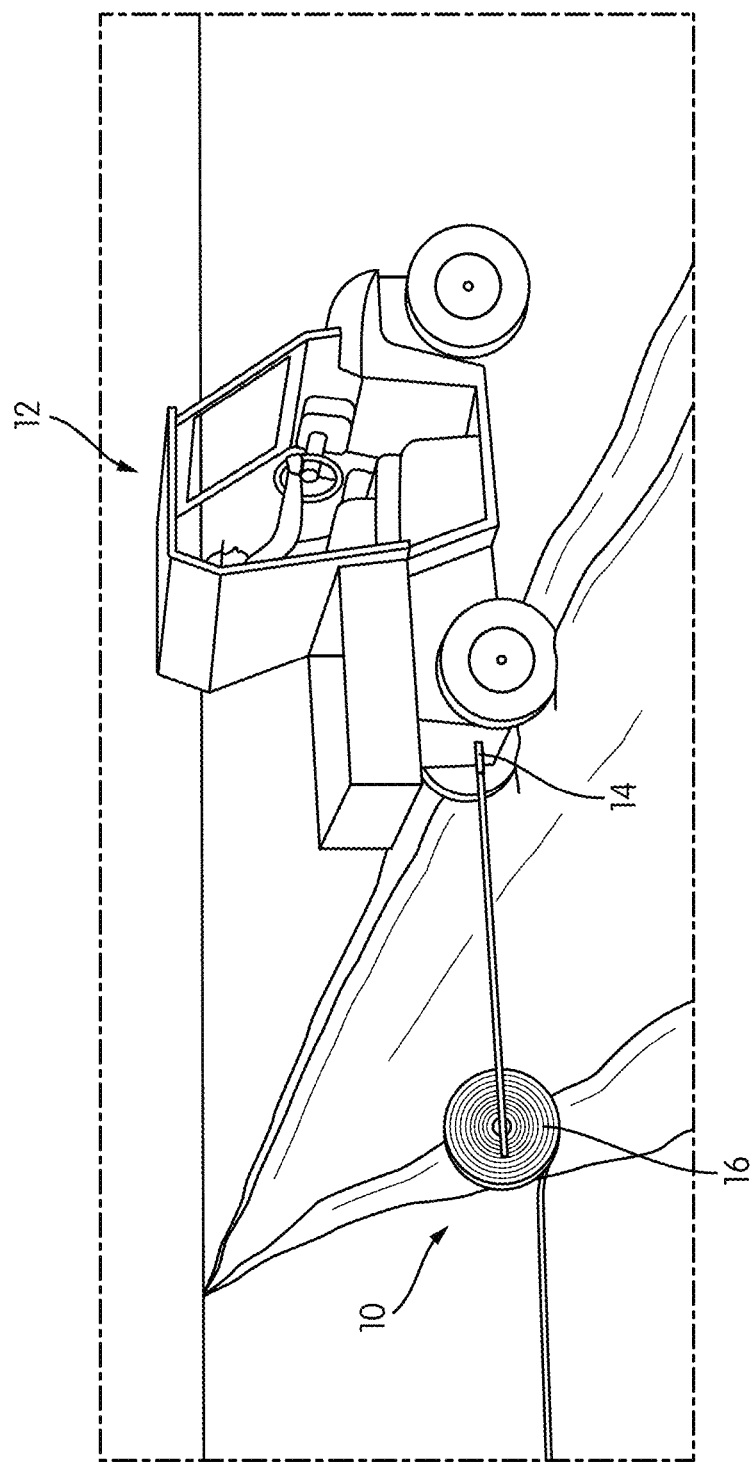
FIG. 1 is a perspective view of a vehicle towing a trailer according to a first embodiment of the invention.
Figure 2:
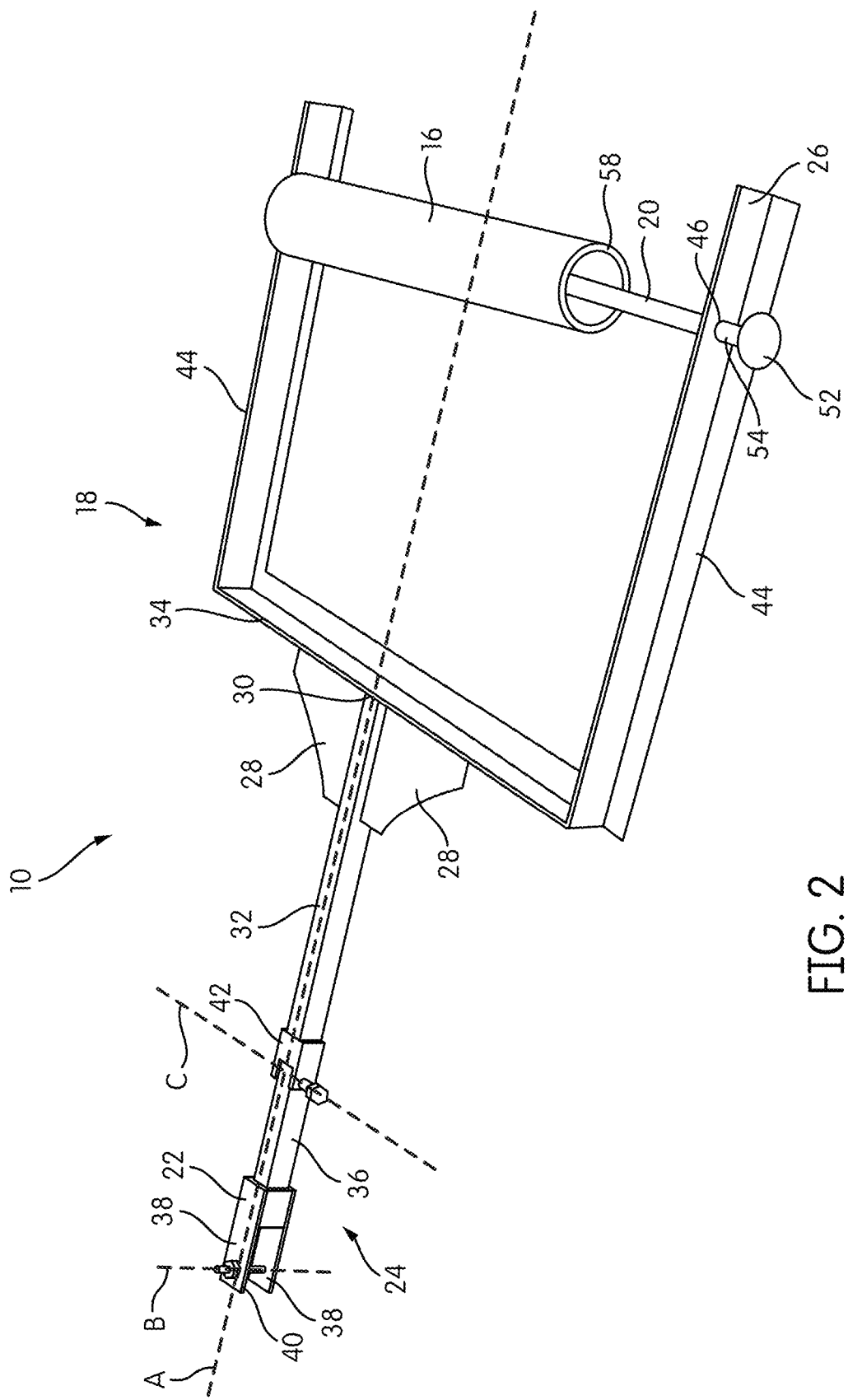
FIG. 2 is a perspective view of the trailer of FIG. 1 detached from the vehicle.

FIGS. 1 and 2 illustrate a trailer 10 for deploying lay-flat pipe according to a first embodiment of the invention. FIG. 1 illustrates a vehicle 12 traversing a rice field while pulling the trailer 10. The trailer 10 is configured to lay a roll of pipe 16, for example flexible polyethylene (PE) pipe 16. Pipe material such as this is provided in rolls which are laid in fields; when the pipe is filled with water it expands and water is distributed through numerous holes in the side walls of the pipe. In the illustrated embodiment, the vehicle 12 is an all-terrain vehicle (ATV). In other embodiments, the vehicle 12 may be an all-terrain utility vehicle (ATU).

Laying a roll of polyethylene pipe for MIRI is described herein as an exemplary use for the various embodiments of the pipe-laying trailer 10.

FIG. 2 illustrates the trailer 10 of FIG. 1 disconnected from the vehicle 12. The trailer 10 includes a generally Y-shaped frame 18 and a spindle 20 that is rotatably coupleable to the frame 18. The frame 18 has a first end 22 with a hitch assembly 24 that is configured to be attached to a hitch 14 of the vehicle 12. The frame 18 also has a second end 26 that is generally U-shaped to couple the spindle 20 to the frame 18. Two support brackets 28 are disposed adjacent a connection point 30 between the first end 22 and the second end 26. In particular, a first member 32, having a longitudinal axis defines a first axis A, and a cross member 34 are joined to define the connection point 30.

In various embodiments, the trailer 10 is attached to the vehicle 12 in a manner which permits the trailer 10 to move relative to the vehicle 12, for example to pivot, rotate, etc. This freedom of movement may be achieved using a single element such as the ball hitch 14 on the vehicle 12 with a suitable attachment on the trailer 10, or using a series of individual elements, each of which confers a particular degree of freedom of movement, as described herein. In general, the hitch connection point between the hitch 14 and the hitch assembly 24 is configured so that it allows the hitch 14 to move in an up and down motion as the levees are oriented at an aggressive angle of about 70 degrees relative to a generally horizontal plane defined by the field at the bottom and apex of a levee, therefore the full range of motion is about 140 degrees.

Figure 4:
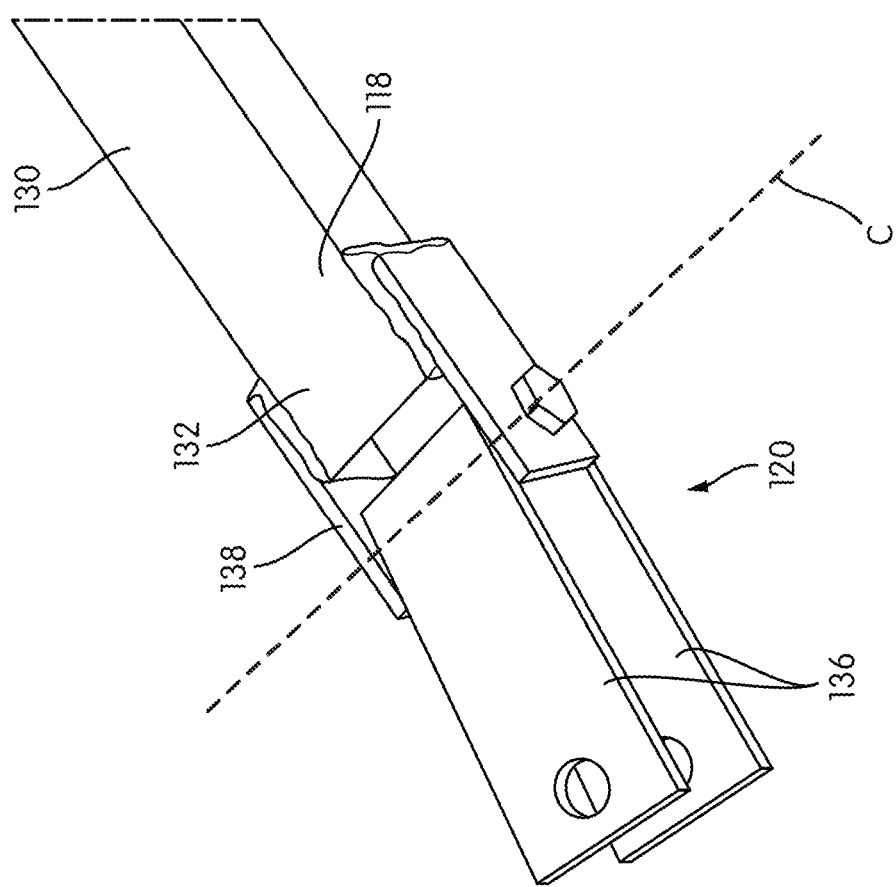
FIG. 4 is a perspective view of a hitch assembly.

In the illustrated embodiment of FIGS. 1 and 2, the hitch assembly 24 includes a main support 36 with two extensions 38 and a vertically-oriented round pipe 40 whose longitudinal axis defines a second axis B. The round pipe 40 extends between the two extensions 38 and may be welded at each end to the two extensions 38. In other embodiments, the round pipe 40 may be fixed to the extensions 38 in other ways. In yet other embodiments, the round pipe 40 may be removably coupled to the trailer 10, as illustrated in FIG. 4. The hitch assembly 24, and more particularly, the round pipe 40 is configured to hold a U-shaped hitch 14 of the vehicle 12, so that the trailer 10 can freely rotate about the second axis B. Furthermore, because the connection between the U-shaped hitch 14 and the round pipe 40 is not fixed, movement, besides rotational movement, between the hitch assembly 24 and the hitch 14 of the vehicle 12 may be possible.

FIG. 2 illustrates that the hitch assembly 24 may be attached to the first member 32 of the trailer 10 through a hinge joint 42. The hinge joint 42 is spaced from the vertically oriented round pipe 40 by a distance along the first axis A. The rotational axis of the joint 42 defines a third axis C. The joint 42 allows for the second end 26 of the trailer 10 to rotate about the third axis C (e.g., vertical movement in relation to the vehicle 12). The vertical movement of the second end 26 allows the trailer 10 to more easily traverse over levees and bar ditches of the rice field, as described in greater detail below. Accordingly, the second end 26 of the trailer 10 is capable of substantial rotation about the second axis B and the third axis C. In general, the hitch assembly 24 is configured so that it allows the trailer 10 to pivot side-to-side (e.g., about the second axis B), pivot up-and-down (e.g., about the third axis C), and to allow for lateral movement (e.g., along the first axis A and directions parallel to the second and third axes B, C) in relation to the vehicle 12.

In other embodiments, the hitch assembly 24 may not include a main support 36. In particular, similar to the embodiment illustrated in FIG. 2, the extensions 38 are much longer than those described above and mate directly at the joint 42 with the first member 32.

In other embodiments, the hitch assembly 24 may be a ball hitch receiver for coupling to a vehicle 12 with a ball hitch 14, as is known in the art. In yet other embodiments, the coupling between the vehicle 12 and the trailer 10 may be another method as is known in the art.

FIG. 2 illustrates the U-shape of the second end 26 of the trailer frame 18. The second end 26 of the trailer 10 includes the cross member 34 and two parallel members 44. The parallel members 44 are positioned at opposite ends of the cross member 34 so that the parallel members 44 are spaced from each other in a direction parallel with the third axis C. The first member 32 is fixed to the cross member 34 at a near midpoint of the cross member 34 so that longitudinal axes of the parallel members 44 are spaced from the first axis A an equal distance. The parallel members 44 each have an opening 46 aligned in a direction parallel with the third axis C so that the spindle 20 may be coupled to the frame 18, as described in greater detail below.

Figure 3:
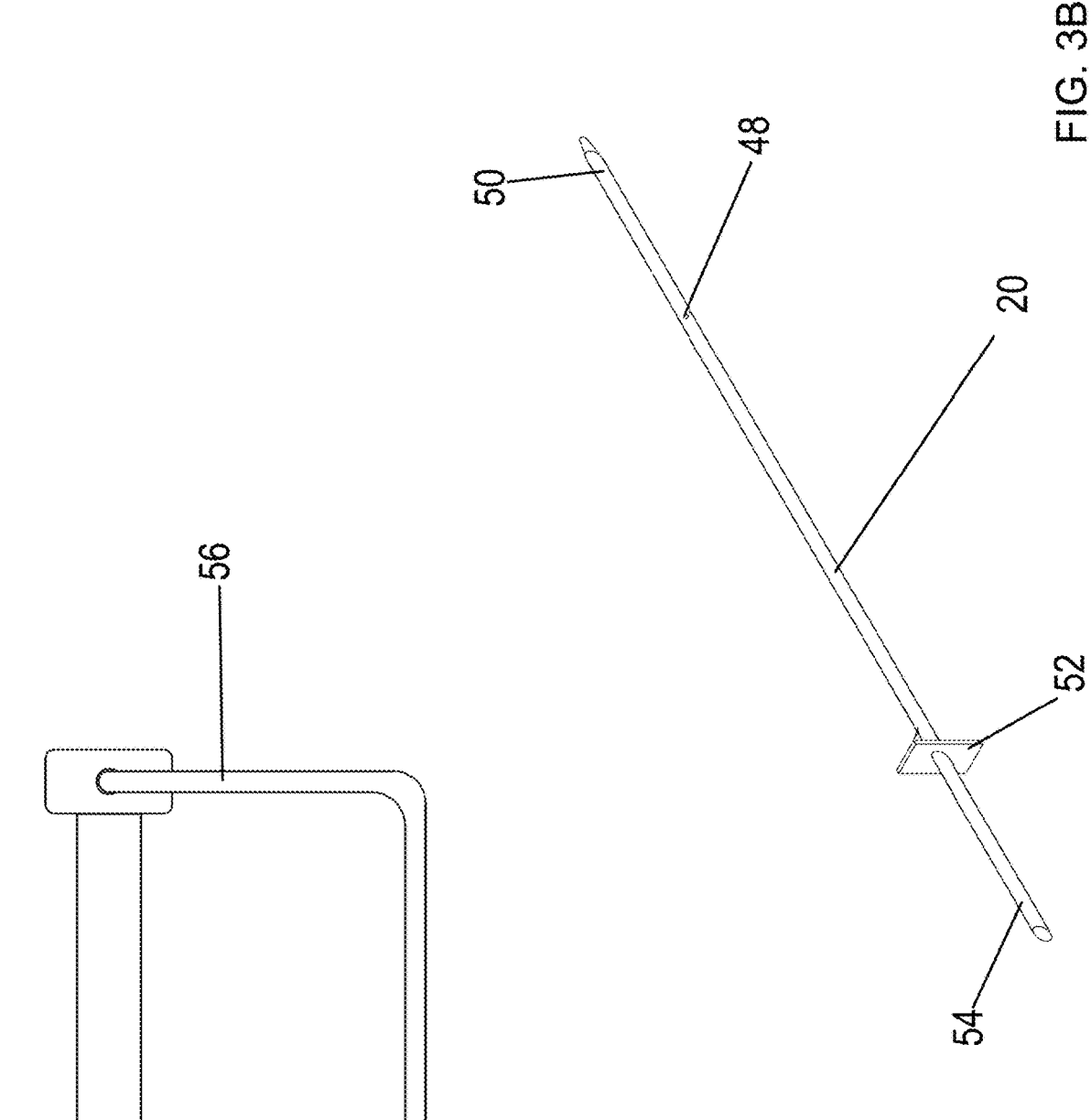
FIG. 3A is a perspective view of a pin used with the trailer of FIG. 1.
FIG. 3B is a perspective view of a spindle used with the trailer of FIG. 1.

FIG. 3B illustrates one embodiment of the spindle 20. The spindle 20 includes a channel 48 extending there through at a first end 50 and a plate 52 near a second end 54. FIG. 2 illustrates that the spindle 20 is inserted through the openings 46 of the parallel members 44 to couple the spindle 20 to the frame 18. The openings 46 are spaced at least a certain distance from the cross member 34 so that the roll of pipe 16 can fit into the trailer 10 when fully assembled. The plate 52 prevents the spindle 20 from extending too far into the frame 18 in a direction that is parallel to the third axis C. After the spindle 20 has been inserted through both the openings 46 of the parallel members 44, a pin 56 (FIG. 3A) may be inserted into the channel 48 to prevent the spindle 20 from extending too far into the frame 18 in a direction opposite the direction prevented by the plate 52. The spindle 20 is configured to act as an axle of the trailer 10, while the roll of pipe 16 is being laid along the rice field. The roll of pipe 16 includes a channel 58, as can be seen in FIG. 2, through which the spindle 20 is placed. The roll of pipe 16 is therefore rotatably coupled to the trailer 10 through its assembly with the spindle 20.

FIG. 1 shows the vehicle 12 and the trailer 10 in operation traveling over a levee while laying a roll of pipe 16. As the vehicle 12 travels over the levee and down into bar ditches on either side of the levee, the roll of pipe 16 maintains substantial contact with the rice field because the trailer 10 includes the hinge joint 42 and is pivotable about the third axis C. Similarly, after the vehicle 12 has passed over the levee, the roll of pipe 16 maintains substantial contact with the levee by pivoting in a direction opposite that described above about the pivot axis C. However, because of the pivoting action of the trailer 10 and the light weight of the vehicle 12, there is minimal, if any, damage to the levee after the vehicle 12 and the trailer 10 have passed over it. Furthermore, because of the relationship between the U-shaped hitch 14 and the hitch assembly 24, the rough terrain of the rice field is more than negotiable by the vehicle 12 and the trailer 10.

Figure 5:
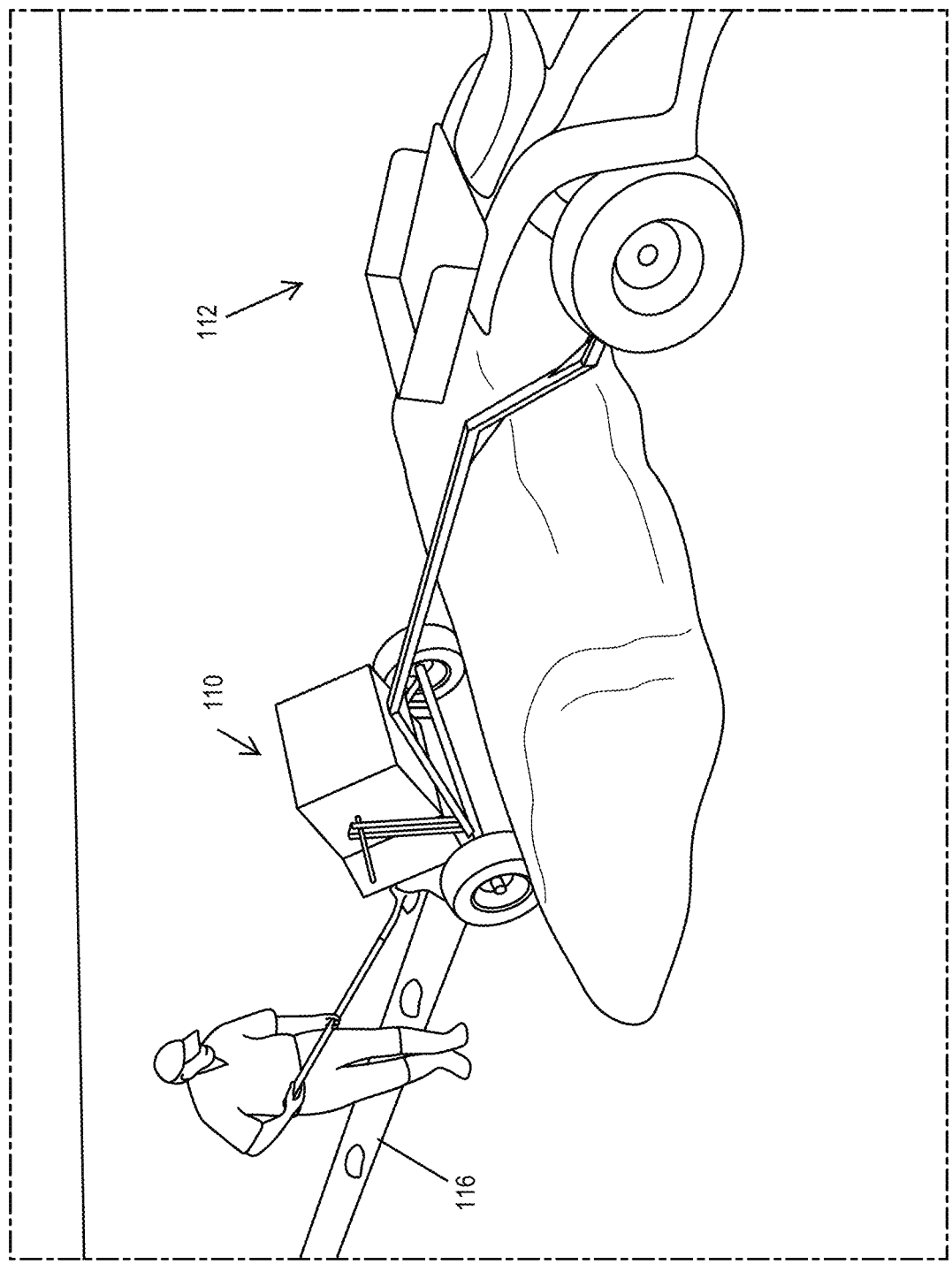
FIG. 5 is a perspective view of a trailer connected to a vehicle.
Figure 6:
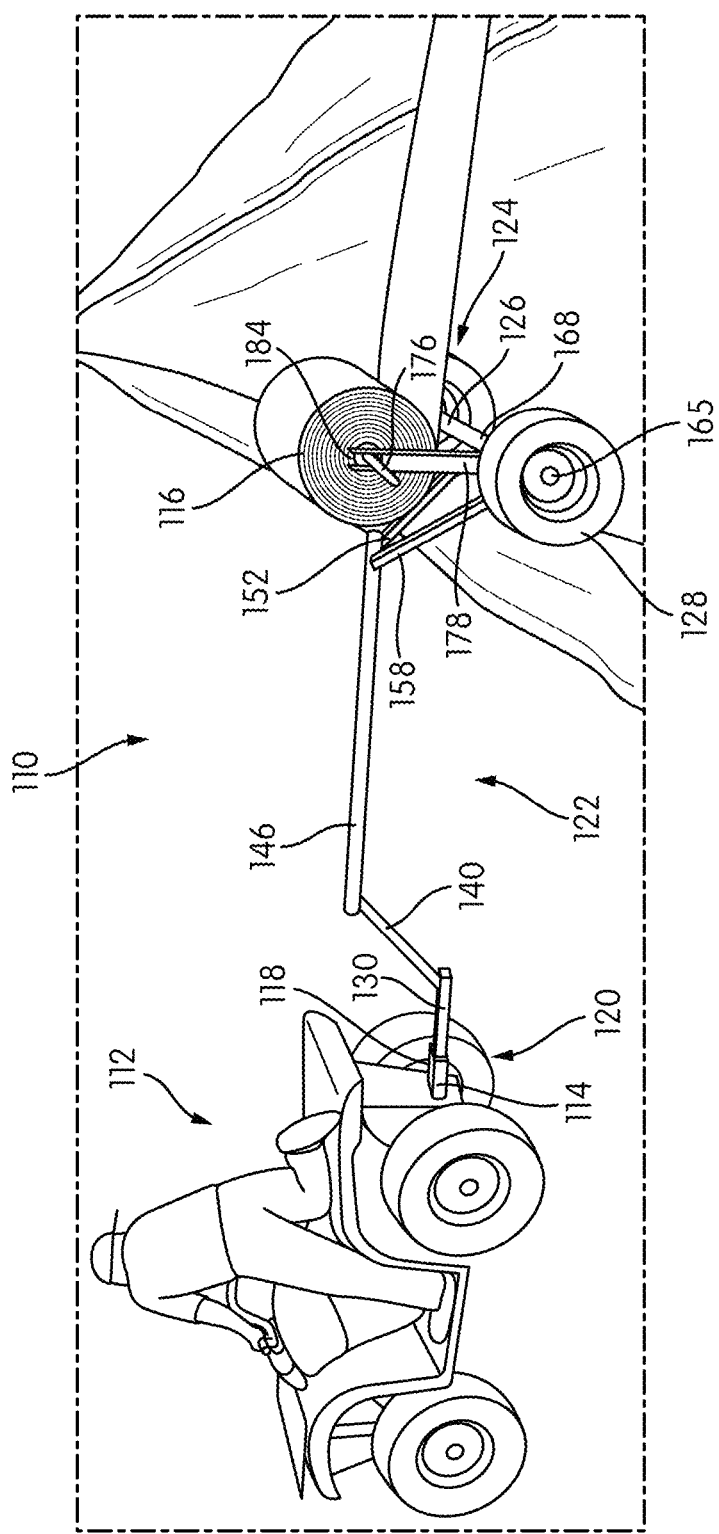
FIG. 6 is a perspective view of a vehicle towing a trailer according to another embodiment of the invention.

FIGS. 5 and 6 illustrate a vehicle 112 traversing a rice field with a pipe-laying trailer 110 according to another embodiment of the invention. Similar to the first embodiment, the trailer 110 is configured to deploy a roll of lay-flat pipe 116 and the vehicle 112 may be a vehicle such as an ATV or an ATU.

Figure 8:
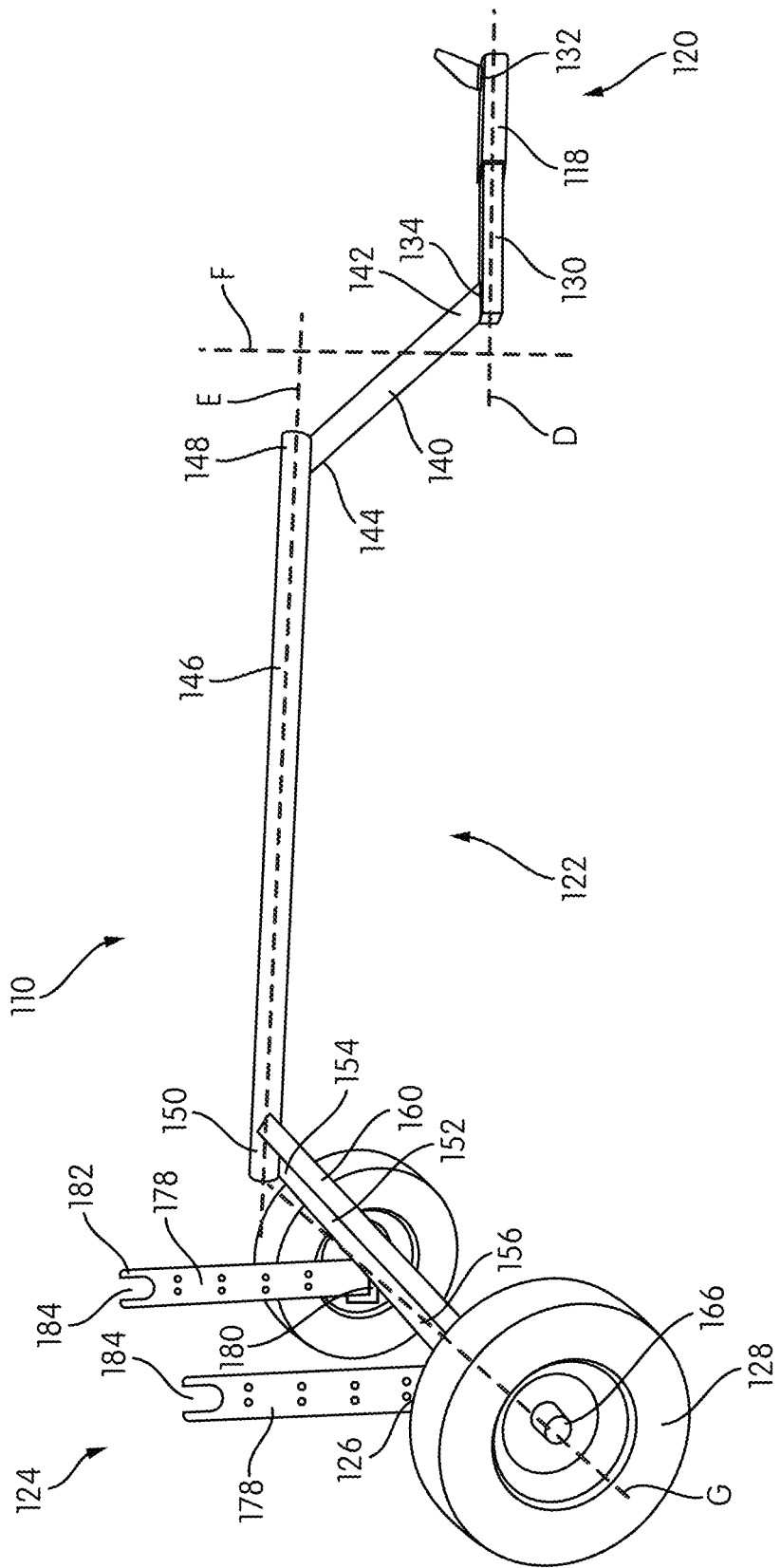
FIG. 8 is a perspective view of the trailer illustrated in FIG. 6.
Figure 17:
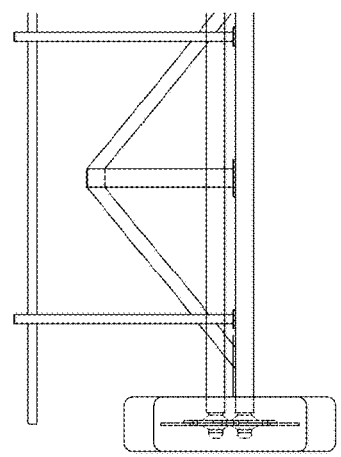
FIG. 17 is a partial rear view of the trailer illustrated in FIG. 12.

FIG. 8 illustrates the trailer 110 disconnected from the vehicle 112. Similar to the trailer 10 of the first embodiment, the trailer 110 includes a first end 118 with a hitch assembly 120. The trailer 110 also includes a gooseneck frame 122, a distribution assembly 124 that is coupled to the gooseneck frame 122 at a second end 126 of the trailer 110, and a pair of low-pressure wheels 128 also at the second end 126.

The hitch assembly 120 of the trailer 110 may be the same as the hitch assembly 24 described above for the trailer 10 and therefore will not be described again herein.

FIGS. 5-11 illustrate the gooseneck frame 122 of the trailer 110. In general, the gooseneck frame 122 is configured to couple the hitch assembly 120 to the distribution assembly 124 in a manner that provides an elevated clearance to facilitate pulling the trailer over levees without damaging them. The gooseneck frame 122 includes a first member 130 having a first end 132 that is coupled to two extensions 136 of the hitch assembly 120 at a joint 138 as similarly described above and illustrated in FIG. 4. With reference to FIG. 8, the first member 130 includes a longitudinal axis that defines a lower axis D. A second end 134 of the first member 130 is attached to a first end 142 of a first angled member 140 that extends from the first member 130 such that a longitudinal axis of the first angled member 140 and the lower axis D define a first angle. In the illustrated embodiment, the first angle is approximately 135 degrees. A first end 148 of an upper member 146 extends from a second end 144 of the first angled member 140 in a direction parallel to the lower axis D. The upper member 146 includes a longitudinal axis that defines an upper axis E, and therefore the upper axis E is parallel to the lower axis D. As illustrated in FIG. 9, the upper and lower axes E, D are spaced a distance along a sixth (e.g., vertical) axis F such that the upper member 146 is spaced from the first member 130 along the sixth axis F to provide clearance for the trailer 110 as it travels across the field (e.g. a rice field), as described in further detail below. A first end 154 of a second angled member 152 extends from a second end 150 of the upper member 146, such that a longitudinal axis of the second angled member 152 and the upper axis E define a second angle. In the illustrated embodiment, the second angle is also approximately 135 degrees. The second angled member 152 extends from the upper member 146 in a direction partially along a direction parallel to the sixth axis F (i.e., toward the lower axis D). In the illustrated embodiment, the first angled member 140 and the second angled member 152 are the same length. Therefore, as illustrated in FIGS. 8 and 9, the lower axis D extends through a second end 156 of the second angled member 152. In particular, the second angled member 152 extends to an axle housing 168 of the trailer 110. As illustrated in FIGS. 9 and 10, the gooseneck frame 122 further includes angled support brackets 158, 160 that extend from the upper member 146 to the axle housing 168. The gooseneck frame 122 may further include a first supporting member 162 and a second supporting member 164. The first support member 162 extends between the upper member 146 and the first angled member 140, while the second support member 164 extends between the upper member 146 and the second angled member 152.

The length and height of the gooseneck frame 122 are designed to accommodate the contour of a typical rice field levee to prevent the frame 122 from damaging any levees of the rice field. Specifically, the distance between the upper axis E and the lower axis D is at least the same as the difference in height between a planting level of the rice field and the peak of the rice field levee. In one construction, the distance between the upper axis E and the lower axis D is greater than the height difference between the peak of the levee and the planting level of the rice field. The length of the upper member 146 allows for the gooseneck frame 122 to extend entirely over the levee. In other words, the length of the upper member 146 prevents the trailer 110 from substantially contacting and damaging a levee because rear wheels of the vehicle 112 may be in one planting portion of the rice field, on a first side of the levee, and the low-pressure wheels 128 of the trailer 110 may be in another planting portion of the rice field, on a second side of the levee.

The trailer 110 further includes an axle 166 extending between the pair of low-pressure wheels 128. A longitudinal axis of the axle 166 defines an axle axis G, whereby the axle axis G intersects with and extends perpendicular to the lower axis D. The trailer 110 also includes an axle housing 168, mentioned above, with a channel 170 extending therethrough for the axle 166. The axle housing 168 also includes at least three flat plates 172 on an upper side 174 of the housing 168. The flat plates 172 provide welding platforms for the second angled member 152 and the distribution assembly 124, as described in greater detail below. Two other flat plates 172 may be provided on the upper side 174, or another side of the housing 168, for welding the first supporting member 162 and the second supporting member 164 to the axle housing 168. In other embodiments, the axle housing 168 may include at least one flat surface that extends the entire length of the axle housing 168.

Illustrated in FIGS. 9 and 11, the distribution assembly 124 of the trailer 110 includes a spindle 176 and two support posts 178 configured to support the spindle 176. The spindle 176 may be similar to the spindle 20 described above, and therefore will not be described in detail herein. The two support posts 178 extend from the axle housing 168, from respective first ends 180 of the support posts 178, in a direction that is parallel to the sixth axis F. The support posts 178 are also spaced from each other in a direction that is parallel to the axle axis G and are welded to the other two flat plates 172 on the axle housing 168. In the illustrated embodiment, respective second ends 182 of the support posts 178 project beyond the upper axis E, as illustrated in FIGS. 9 and 11, to provide an elevated mount for the spindle 176. The second ends 182 of the support posts include recesses 184, as illustrated in FIG. 9, to provide the spindle mount. In the illustrated embodiment, gravity maintains the spindle 176 and the roll of pipe 116 in the recesses 184. In other embodiments, other locking means may or may not be used to keep the spindle 176 and roll 116 in place. As such, the spindle 176 and therefore the roll of PE pipe 116, is positioned directly above the axle axis G. In other embodiments, the second ends 182 of the support posts 178 may include openings (not illustrated), similar to the openings 46 of the two parallel members 44 described above, to provide a mount for the spindle 176.

FIG. 6 shows the vehicle 112 and the trailer 110 in operation traveling over a levee while laying a roll of PE pipe 116. As similarly described above for the operation of the trailer 10, the trailer 110 is pivotable about the joint 138 (FIG. 4). As such, the trailer 110 and the vehicle 112 do not need to be on flat ground to work properly. Accordingly, as the vehicle 12 travels over a levee of the rice field and down into bar ditches, the pipe 116 is continuously laid from the distribution assembly 124 onto the field.

Just after the vehicle 112 has traveled over the levee, only certain parts of the trailer 110 will be over the levee. Specifically, the first member 130 and the first angled member 140 will have traveled over the levee, but the second angled member 152 and therefore, the wheels 128 will not have traveled over the levee. As explained above, in this position, the trailer 110 spans the levee and does not substantially contact the levee. Therefore, the vehicle 112 can continue forward, until the wheels 128 begin to travel up the levee, causing the trailer 110 to begin to pivot about the joint 138. After completely traversing the levee with the trailer 110 and the vehicle 112, the levee will remain substantially unchanged due to the light weight of the vehicle 112 and because the trailer 110 minimally (if at all) contacts the levee. As stated above, because of the pivoting action of the trailer 110 and the lightweight of the vehicle 12, there is minimal, if any, damage to the levee after the vehicle 112 and the trailer 110 have passed over it. Furthermore, because of the relationship between the U-shaped hitch 114 and the hitch assembly 120, the rough terrain of the rice field is more than negotiable by the vehicle 112 and the trailer 110.

Figure 7:
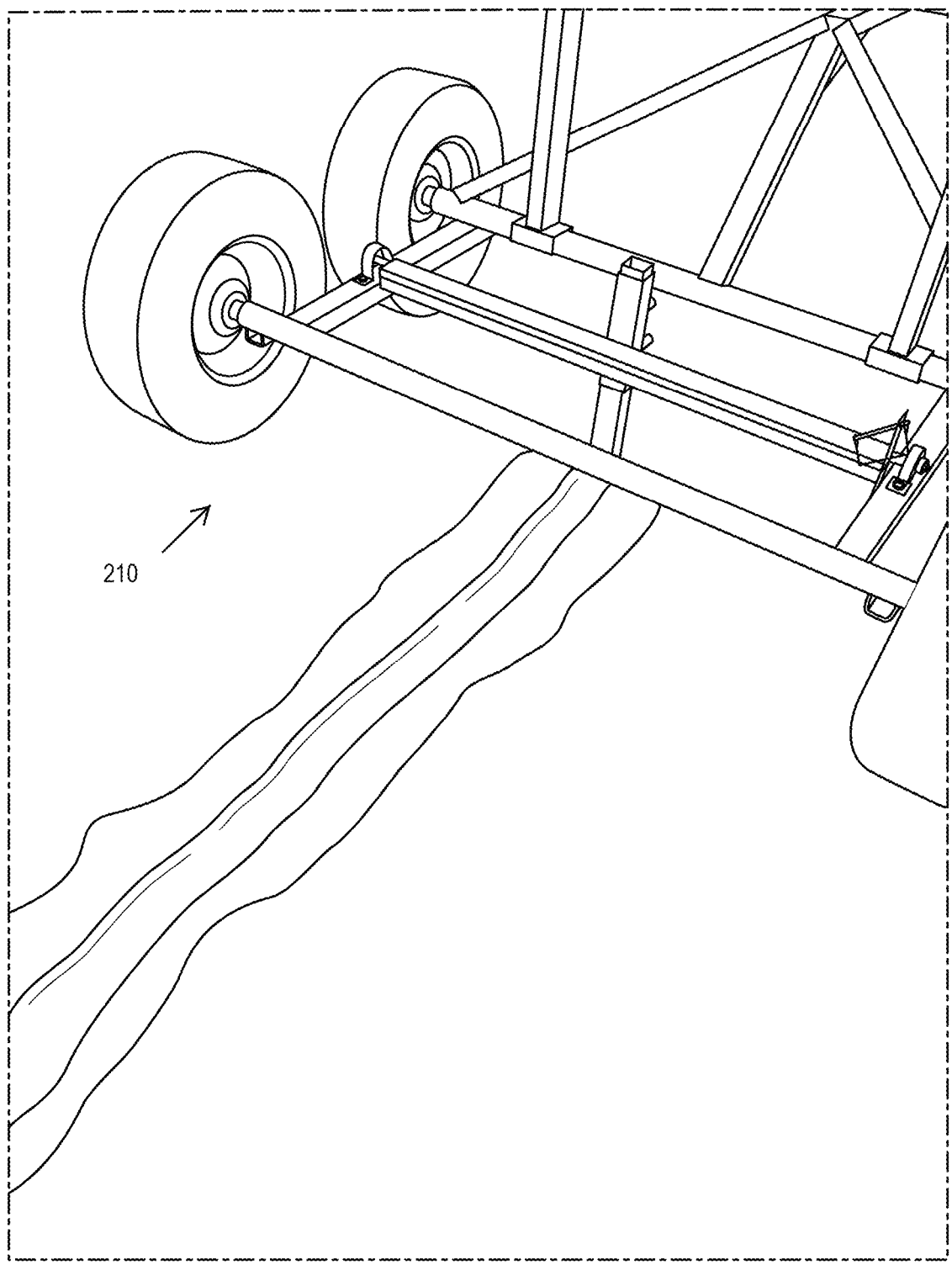
FIG. 7 is a perspective view of a trailer including a furrow assembly.

FIGS. 7, 12, and 13 illustrate a pipe-laying trailer 210 according to another embodiment of the invention. The trailer 210 is generally the same as the trailer 110 of the second embodiment described above. Therefore, equivalent parts of the trailer 210 will be numbered the same, plus 100, as the trailer 110 and will not be described herein. However, in addition to the general structure of the trailer 110, the trailer 210 incorporates an optional furrow assembly 300.

Figure 16:
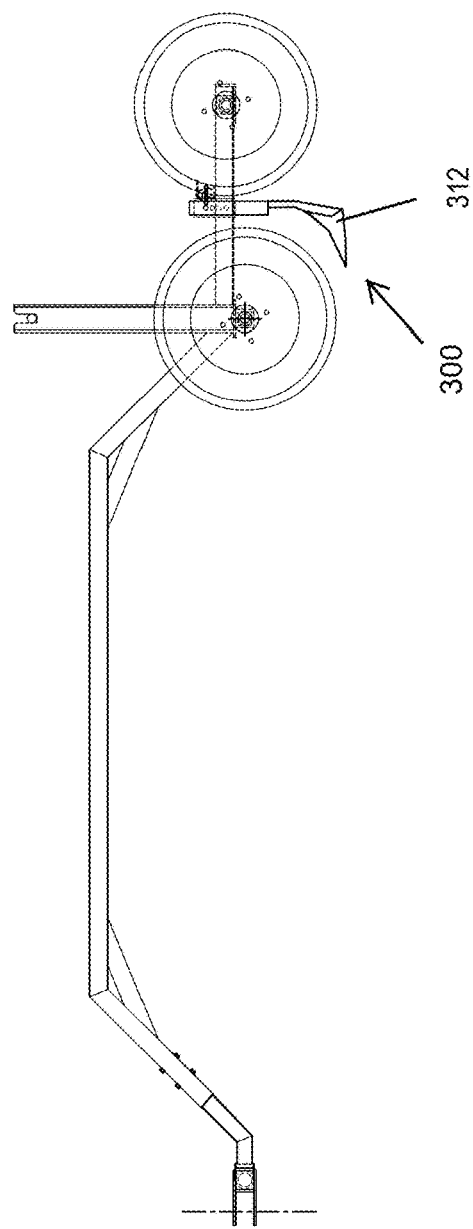
FIG. 16 is a side view of a furrow assembly of the trailer illustrated in FIG. 12

Specifically, the furrow assembly 300 of the trailer 210 is configured to create a furrow in a field to lay the pipe 216 into. In one construction, the furrow assembly 300 utilizes double disks 310 as illustrated in FIGS. 12-15. In another construction, the furrow assembly 300 utilizes a shovel 312 as illustrated in FIG. 16. In another construction, the furrow assembly 300 utilizes a triangular shaped plow.

With reference to FIGS. 12-15, the furrow assembly 300 includes a second set of wheels 302 with a second axle 304 and a second axle housing 306 that is separated from the first axle housing 268 by two linking members 308. In the illustrated embodiment, the two linking members 308 are welded to the first axle housing 268 and are spaced in a direction parallel to the axle axis G. In other embodiments, the two linking members 308 may be welded to the two support posts 278. Furthermore, in other embodiments, the two linking members 308 may be coupled to the first axle housing 268 or the two support posts 278 in a removable fashion. Accordingly, if one section of the field needs a furrow for the pipe 216, while another section of the field does not, the furrow assembly 300 can be quickly and easily removed or attached, accordingly.

The tandem axle prevents damage to the levee when crossing it with the disk or shovel mechanism down. The disk or shovel mechanism rotates about an axis so that it can be retracted when not in use. The operator rotates the disk or shovel down when pipe is being placed. A pin holds the disk or shovel up during transport, and when placed in the down position, the forward movement of the trailer 210 locks the disk or shovel in the down position forcing it to create the furrow as the trailer 210 is propelled forward.

In the illustrated embodiment, the furrow is formed by two disks 310 positioned between the first axle housing 268 and the second axle housing 306. The disks 310 are coupled to the two linking members 308 by a furrow shaft 312. As illustrated in FIG. 13, a longitudinal axis of the furrow shaft 312 lies parallel with the axle axis G and the longitudinal axis of the second axle 304. The two disks 310 are coupled to the furrow shaft 312 by a vertically adjustable assembly 314 at an approximate center of the furrow shaft 312. Therefore, the furrow created by the two disks 310 is aligned with the pipe 216 so that the pipe 216 can be laid into the furrow. As illustrated more closely in FIGS. 14 and 15, the adjustable assembly 314 includes an outer member 316 and an inner member 318 that is disposed within the outer member 316 such that longitudinal axes of the outer and inner member 316, 318 are co-aligned. The outer member 316 is fixed to the furrow shaft 312 and includes an opening (not illustrated) which may be positioned to align with openings 320 of the inner member 318. A pin (not illustrated) can be inserted through the opening of the outer member 316 and into one of the openings 320 of the inner member 318 to fix the position of the inner member 318 in relation to the outer member 316. By fixing the position of the inner member 318, the vertical positon of the discs 310 is set. In the illustrated embodiment, the openings 320 are spaced from respective, adjacent openings 320 in a direction parallel with the sixth axis F. The lowest opening 320 of the inner member 318 (i.e., the highest position of the discs 310) allows for the discs 310 to be raised above the wheels 228, 302 of the trailer 210. Accordingly, the discs 310 do not create a furrow when set at this position.

Operation of the trailer 210 is the same as that of trailer 110 when the discs 310 are in their highest position. However, when the discs 310 have been lowered, a furrow is created in the field when the vehicle 212 is traveling over the field.

In another embodiment, the tandem axle has one axle at a slightly higher height than the trailing axle. This embodiment allows for easy turning of the trailer when attached to the ATV or ATU and increases the weight applied for the furrow assembly. The second axle then reduces the hitch angle needed as the trailer crosses the bar ditch on a levee because the rear axle restrains the front axle or suspends it from the deepest extent of bar ditch. Additionally, when the trailer crosses the levee the rear axle suspends the front axle from the deepest part of the bar ditch and then the front axle restrains the rear axle from the deepest part of the bar ditch. Essentially this tandem axle creates a smoother transition across the levee with the ATV and trailer resulting in a smoother and less aggressive movement as pipe is placed across the levee. Additionally, the tandem axle allows for the furrow assembly to traverse the top of the levee minimizing damage to the levee crest as the assembly only engages the crest of the levee for a short period while the front axle is crossing the levee crest and is lifted above the levee as the rear axle crests the levee.

Additionally, ATV's and ATU's have different hitch heights, and another embodiment includes a telescoping hitch that adjusts to the height of the receiver hitch on the vehicle pulling the trailer. Adjustment is made by removing pins and telescoping the tongue up and down at a 45 degree angle to adjust to the desired hitch height. Other angles for movement of the tongue are contemplated, such as, for example, 30 degrees, 35 degrees, 40 degrees, 50 degrees, and 55 degrees. When the desired height is reached, the pins are put in place to lock the tongue in place. This feature allows for adjustment for vehicle combinations so that the gooseneck frame has adequate clearance for different sized levees. That is, for a low vehicle hitch elevation and aggressive levee heights, the trailer hitch can be extended so that the trailer and vehicle combination can traverse the field with no levee damage and maintain proper rear axle clearance and furrow assembly contact with the soil.

Arkansas and the mid-south region are primarily furrow and flood irrigated. Currently, agriculture uses 90% of the groundwater resources, and the aquifer withdraws are only about 50% sustainable. There are several methods that can be used to improve furrow irrigation efficiency. Flood and furrow irrigated fields in the mid-south use lay-flat pipe to distribute irrigation water across fields and furrows. Historically, rigid, gated pipe was used to distribute water in furrow irrigation, but in the early 1990's a one-time use lay-flat polyethylene pipe was developed and has become the practice in this region. The pipe reduces the labor needed to install irrigation supply and distribution pipe and is low in cost. Much of the pipe is recycled after use.

Another major advance that has occurred over the last two decades relates to software programs that allow for the proper sizing of holes that are punched in the pipe. Historically, the pipe was punched by guessing the proper hole size; a task that often resulted in holes that created too much pressure in the pipeline and caused it to burst, or in hole sizes that were too large and resulted in low distribution uniformity across the field.

To address this shortcoming of lay-flat pipe, software programs were developed and referred to as Computerized Hole Selection (CHS). The first program was developed by the federal government called PHAUCET, in the late 1990s. Then around 2011, Delta Plastics developed a web-based program and began charging on a per acre basis for its use. This web-based program has essentially replaced the public version of PHAUCET. Delta Plastics made Pipe Planner free to use in 2014. One of the inventors also has developed a mobile app for flood irrigation computerized hole selection and released it in 2015. PHAUCET and Pipe Planner have been developed for furrow irrigation. The mobile app the inventor developed is called Rice Irrigation and it develops lay flat plans for multiple inlet rice irrigation (flood irrigation).

These programs all have similar features in that they provide a written "punch" plan for the irrigator to either punch holes or install and set gates to provide a quantity of water per furrow as a function of row length or quantity of water as a function of levee size. Essentially these plans use a computational process to design a punch plan to partition water so that it is distributed evenly across the field.

The irrigators working in the field have found that it is difficult to implement these punch plans. It is difficult to implement the punch plan because the plans typically call for many different hole sizes and quantities. For example, in furrow irrigation complicated punch plans may call for anywhere from one to several hundred hole punches of one particular size, then change size some place along the pipeline. In some cases the entire pipeline is one hole punch size while in other cases the punch plan may entail a dozen different hole sizes at many different and irregular locations along the pipeline. It is very difficult to locate the hole change locations manually and many irrigators get frustrated or cannot accurately apply the plan. In the case of MIRI, large holes and gates are used, and each levee will have a different number or gate opening setting. The holes are 2.5 inches in diameter and have a gate that can be closed to reduce the flow rate through the hole and gate. Rice fields will have between half a dozen to several dozen levees and it is difficult for the irrigator to keep track of which levee they are in and what the punch plan and gate setting is for each levee. In a rice field with three dozen levees each levee could have a different punch plan and gate setting. Such punch plans are very difficult for the irrigators to implement correctly. The device places a punch label at set intervals along the pipeline during install so that the irrigator can physically punch the proper hole in the pipeline when filled with water at a later time.

Figure 18:
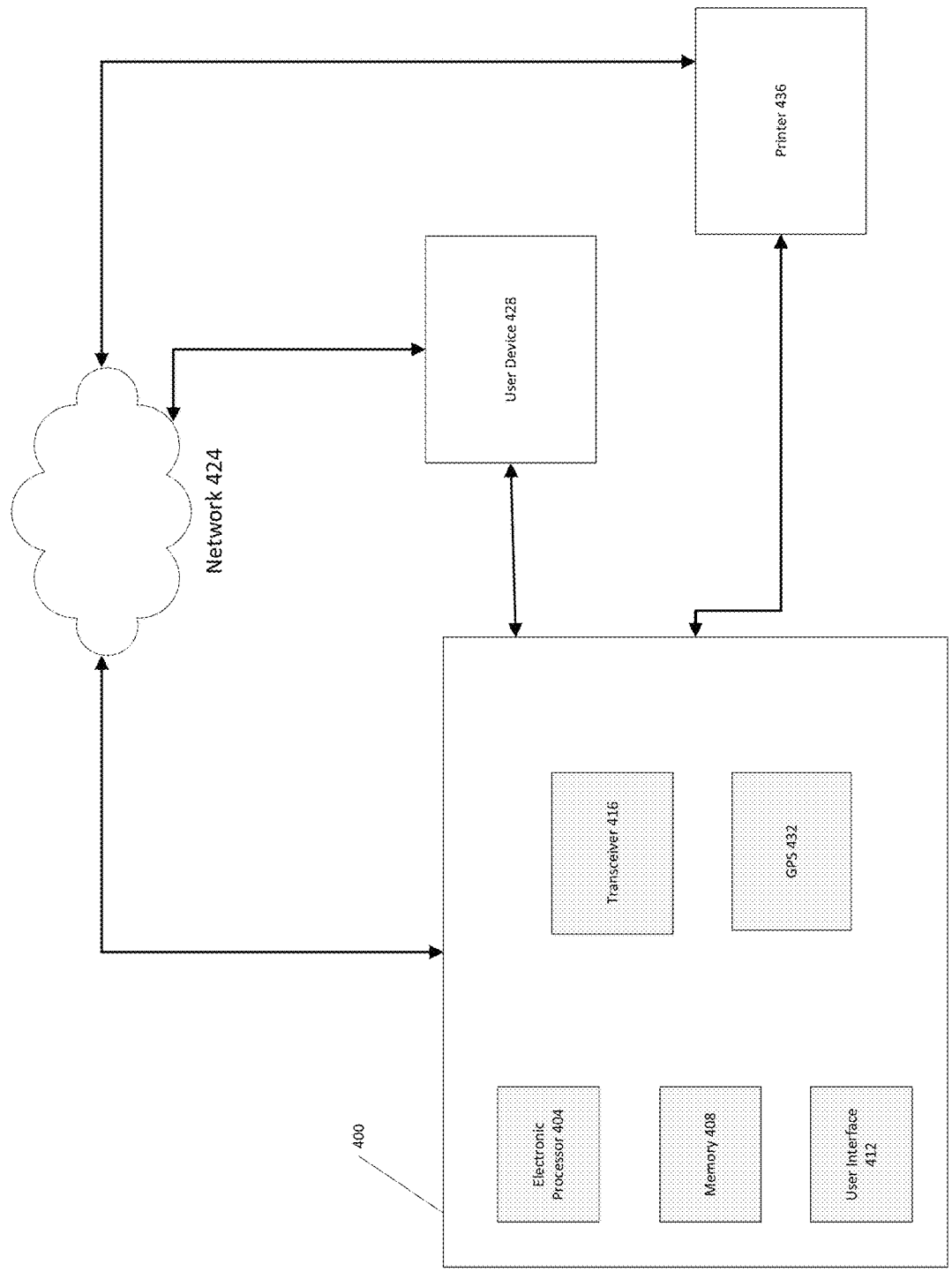
FIG. 18 is a block diagram of a printed punch plan system.

As illustrated in FIG. 18, the invention includes a printed punch plan system 400 that receives the computerized hole selection plan and converts it to a digital plan for printing on the lay flat pipe. The irrigator can then punch the holes as printed on the lay flat pipe.

The end result is that the hole punch plan is then visually identifiable, and the irrigator only needs to punch the plan that is printed on the irrigation pipe. This reduces time, energy, labor and error in implementing computerized hole selection plans. CHS is a practice that has been documented by the inventor and others to realize about a 20% irrigation water and energy savings in furrow and flood irrigation. Additionally, the visually identifiable punch plan on the pipe saves considerable time and reduces confusion and saves considerable labor and effort for the user at a time period of the growing season when the workload is extremely high.

The printed punch plan system 400 includes a plurality of electrical and electronic components that provide power, operational control, and protection to the components and modules within the system. The system 400 includes, among other things, an electronic processor 404 (for example, an electronic microprocessor, microcontroller, or similar device), a memory 408 (for example, non-transitory, computer-readable memory), a user interface 412, and a transceiver 416. The system 400 may also include additional or alternative components, including additional electronic processors and memory, or application specific integrated circuits (ASICs). The system may also include a wireless communication module that transfers the punch plan data from a mobile-enabled device to the electronic processor 404. The system 400 may also include a software program stored in the memory 404 and accessed to execute instructions related to generating punch plans.

The components of the system 400 may be connected in various ways including, for example, a local bus. In the exemplary embodiment, the electronic processor 404 is communicatively coupled to the memory 408 and executes instructions stored on the memory 408. The electronic processor 404 is configured to retrieve from the memory 408 and execute, among other things, instructions related to the control processes and methods described below.

The memory 408 stores program instructions and data. The memory 408 may include, for example, a program storage area and a data storage area. The program storage area and the data storage area may include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices.

The user interface 412 may include multiple input mechanisms including one or more buttons, dials, or selectable icons displayed on a screen. In some embodiments, the user interface 412 includes a touchscreen that performs at least portions of the input and output functionality of the system 400. For example, the user interface 412 may be configured to receive input (for example, input generated as a result of selections made via the touchscreen) and to display or output information and graphical elements (for example, on the touchscreen display). In some embodiments, the electronic processor 404, executing software stored in memory 408, generates a graphical user interface that is displayed on the touchscreen and that includes selectable menus, selectable icons, and blank fields or text entry boxes to receive inputs relating to various parameters of the punch plan.

The memory 408 may be communicatively coupled to the transceiver 416 for further communication with a user device 428. The transceiver 416 outputs data from the memory 408 to a network 424. The transceiver 416 may have both a wired (e.g., a USB connection) and a wireless connection (e.g., a transmitter) for communication with the network 424. The system 400 is configured to connect to and communicate through the transceiver 416 to the network 424. In some embodiments, the network 424 may be, for example, a wide area network ("WAN") (e.g., a TCP/IP based network, a cellular network, such as, for example, a Global System for Mobile Communications ["GSM"] network, a General Packet Radio Service ["GPRS"] network, a Code Division Multiple Access ["CDMA"] network, an Evolution-Data Optimized ["EV-DO"] network, an Enhanced Data Rates for GSM Evolution ["EDGE"] network, a 3GSM network, a 4GSM network, a Digital Enhanced Cordless Telecommunications ["DECT"] network, a Digital AMPS ["IS-136/TDMA"] network, or an Integrated Digital Enhanced Network ["iDEN"] network, etc.).

The user device 428 may be a handheld device, such as a mobile telephone, a mobile two-way radio, a smart watch, and the like configured to communicate over the network 424. For example, in some embodiments, the user device 428 may be a handheld cellular telephone carried by an irrigator in the field. Alternatively, the user device 428 may be a computing device, such as a personal computer, a laptop computer, a tablet computer, and the like. Accordingly, it should be understood that the user device 428 may be any type of electronic device capable of communicating over the network 424. The user device 428 may include a mobile app or other internet databases, or internet of things devices, to which the system 400 communicates to implement the punch plan in real-time. The mobile app that has been developed for rice irrigation multiple inlet rice irrigation is called rice water and is usable with this invention. In the mobile app, the user develops a computerized hole punch plan for levee rice (flood irrigation). The user can upload the CHS plan to the system 400 either directly or via the network 424. A special computer file format has been developed to convert from the app to an application punch plan for the system 400. In some embodiments, the mobile app may include a visual map (e.g., via Google Maps™) that includes levees or zones that are marked out over the map (e.g., four levees or zones). A circle or other identifying feature may indicate the location of the trailer within the levees or zones. When the trailer passes from one levee or zone to the next the printer 436 may then print the hole size needed in the lay-flat pipe.

The system 400 may also include a tilt switch or global positioning system 432. The GPS system 432 provides location data to the electronic processor 404. The location data can include GPS coordinates (e.g., latitude and longitude coordinates), a speed, a heading, and a time. In some embodiments, the GPS system 432 updates the location data at a predetermined frequency (e.g., approximately once per second). The GPS system 432 remains active when the system 400 is in motion (e.g., the trailer 10, 110, 210 is moving).

The transceiver 416 enables wired or wireless communication from the system 400 to, for example, a printer 436, or the user device 428, via the network 424. In other embodiments, rather than the transceiver 416, the system 400 may include separate transmitting and receiving components, for example, a transmitter, and a receiver. In yet other embodiments, the system 400 may not include a transceiver 416 and may communicate with user device 428 and the printer 436 via a wired connection to the network 424.

The printer 436 is carried by the trailer (10, 110, 210) or the vehicle and receives instructions from the system 400 (e.g., memory 408) to label or print the punch plan on the poly pipe as it is installed in the field.

The printer 436 is comprised of two rollers that support the pipe so that an ink jet printer module that is mounted between the rollers can ink the punch plat at that location onto the pipe. The printer uses a solvent ink that etches into the PE pipe. As the roll of irrigation pipe unrolls as it is being laid across the field, the pipe is fed between the two rollers which support it for the printer. The support mechanism provides support for the rollers, the pipe and the printer. The printer support can accommodate pipe up to 22 inches in diameter or 30 inches in width. One roller is on top where the pipe enters the frame and traverses where a print head then prints on the pipe before exiting the frame and another roller. The rollers keep tension, alignment, and provide the proper distance and position for the print head to "jet" solvent ink to the polyethylene pipe. The support mechanism provides adjustment to accommodate the angle of the pipe as it leaves the trailer or toolbar. For example, the support mechanism may include a 20 degree angle adjustment on the printer support that allows the printer to swivel to accommodate the roll. The support mechanism may also include an adjustment to raise and lower the printer from the pipe as the clearance between the printer and pipe is important to get a clear label. In MIRI, the printer and support are mounted on the trailer, and for furrow irrigation, the printer can be mounted on the toolbar.

The printer 436 is controlled by the system 400. The system 400 may be incorporated into the printer 436 or may be a separate device with electronic communication (e.g., wired or wireless) to the printer. The electronic processor 404 receives a hole punch plan from a user device or server via the network 424 and stores the plan in memory 408 (e.g., as a computer file text file). The system 400 may include a USB port or other media reader to receive a digital media card with a hole punch plan stored thereon. The memory 408 may store a plurality of punch plans.

In one embodiment, the printer 436 is a series of inked rollers that are extended by a series of solenoids, actuators, or stepper motors to press a roller with the hole punch size on the pipe controlled by the system 400.

In one embodiment, the user accesses the user interface 412 to identify the appropriate punch plan for the particular field. The user may also enter information through the user interface 412 such as the start location of the punch plan (at the riser or well). Alternatively, the GPS 432 automatically identifies the appropriate punch plan based on location. The user interface 412 can be used to visually see the punch plan on a display as the system 400 traverses through the field on the trailer (e.g., 10, 110, 210). This option also allows for reversing the punch plan if the user would like to label the pipe from the end of the pipe to the start of the pipe. The user may also change the frequency of the label being printed to the pipe (e.g., every 5 feet or 10 feet, etc.). The user interface 412 may also include a pause or a start and stop command.

The electronic processor 404 may use a rotary encoder or the GPS 432 to determine the travel distance and speed in which to print the punch plan on the pipe. A rotary encoder and tilt sensor may be used to identify the hole selection label changes in the plan based on distance traversed. Based on the punch plan, the distance between levees are known. That is, as the trailer (and system 400) traverses a levee in a flood irrigated rice field, the electronic processor 404 moves to the next levee punch label in the file. For furrow irrigation, the rotary encoder is used to change between punch labels. For example, if there is 453 feet of ½ inch holes, then after 453 feet the electronic processor 404 moves to the next hole label in the plan. The GPS 432 can also be used to determine the travel distance and provide a trigger to change between punch labels in both levee/flood applications and furrow applications.

The system 400 (and printer 436) would be movable between a trailer for MIRI rice but would be relocated for furrow application on pipe installation toolbars pulled by tractors. In both applications the system 400 (and/or printer 436) could be powered by either the electrical system of the vehicle or by solar and battery energy. A solar and battery energy option would be preferred for a permanent MIRI trailer application. A vehicle powered option would be preferred for a tractor mounted application.

Figure 19:
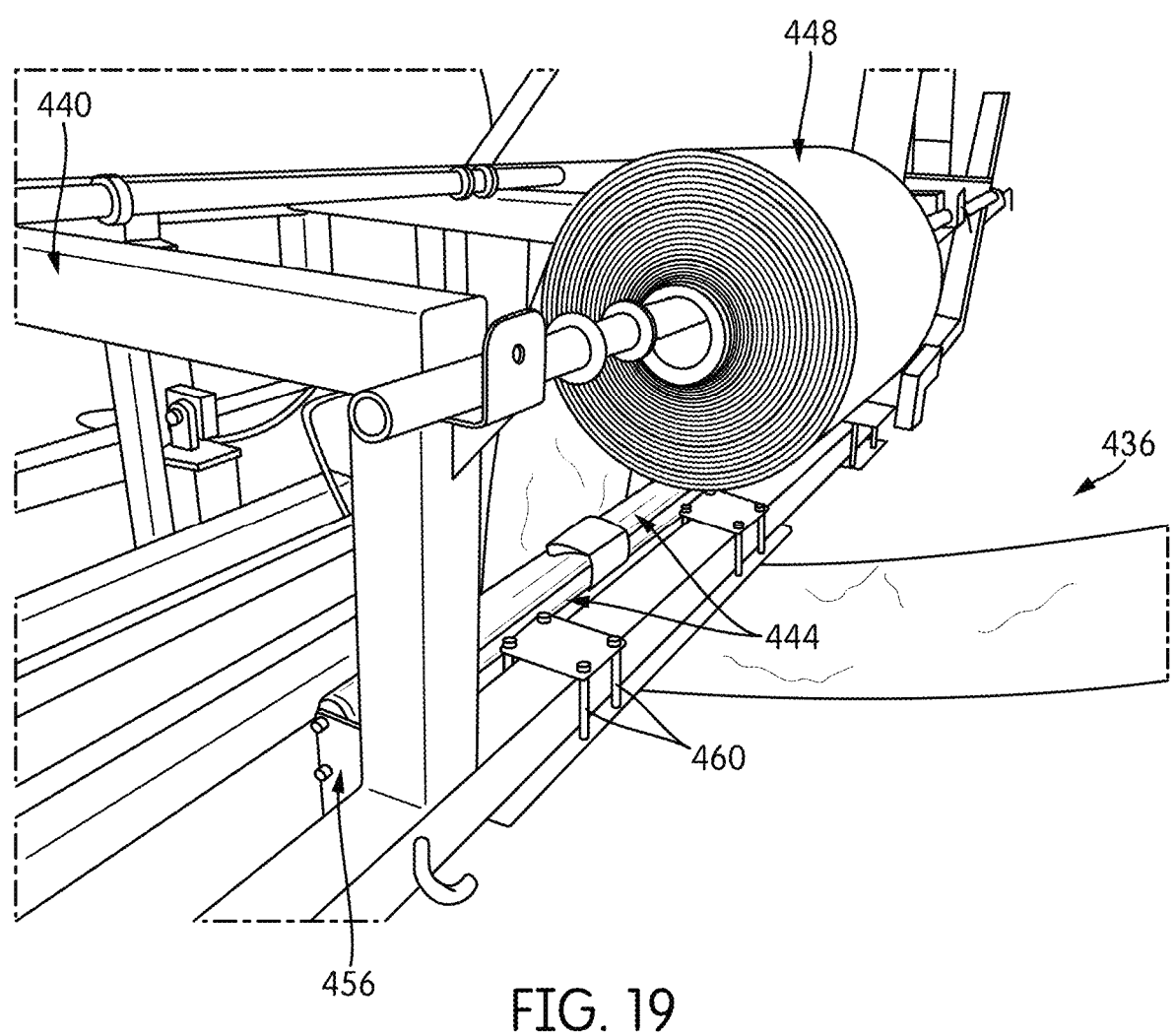
FIGS. 19 and 20 are perspective views of a printer coupled to a commercial toolbar.
Figure 20:
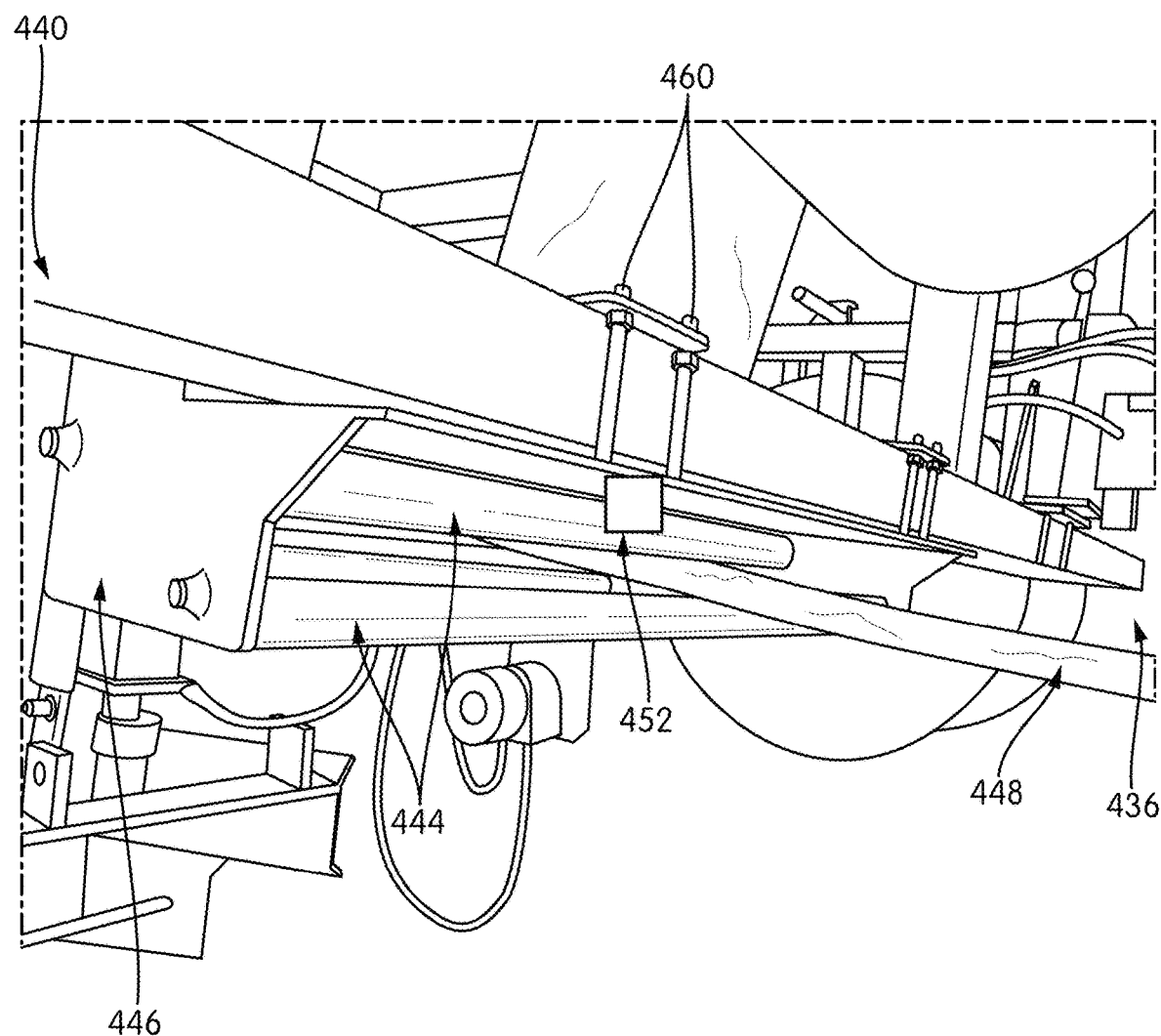

With reference to FIGS. 19 and 20, in some embodiments the printer 436 is coupled to an existing, commercial toolbar 440 pulled by a tractor. The printer 436 includes multiple (e.g., two, three, etc.) rollers 444 that support lay-flat pipe 448 so that an ink jet printer module 452 (illustrated schematically in FIG. 20) that is mounted between the rollers 444 can ink the punch plan at that location onto the pipe 448. In the illustrated embodiment, three galvanized rollers 444 direct the pipe 448 down under a frame of the toolbar 440. As illustrated in FIGS. 19 and 20, the printer 436 may include a linkage body 456 that supports the rollers 444 and is releasably coupled to the toolbar 440 with fasteners 460. As noted above, the printer 436 uses a solvent ink that etches into the pipe 448, and can print on demand. In some embodiments the printer module 452 is protected by a door (e.g., a pivoting door, not shown). The door may rotate so that the user can install the printer module 452, as well as a power and communication cable. The door may then rotate back so that the door protects the cables from being rubbed by the pipe 448. In the illustrated embodiment the rolls of pipe 448 may be heavy (e.g., 150 lbs). The components of the printer 436 remain spaced from the rolls of pipe 448 such that the printer 436 does not interfere with the loading of the rolls of pipe 448. In some embodiments a GPS module is located under the linkage body 456 so that the printer module 452 knows where it is and can print a proper hole size for the pipe location. In some embodiments a stepper motor or solenoid is provided to move a small door over the printer module 452, or to move the printer module 452 itself so that a print head is not exposed to air, thus inhibiting or preventing drying of the ink. As noted above, a mobile app may be used with the printer 436. The mobile app may read in a hole size for different pipe segments from a computerized hole selection plan, or the user may enter the plan manually from the mobile app. The mobile app then uses the GPS location and distance data to print the hole size as the pipe 448 is laid out in the field. In some embodiments the GPS data may be used to set the print speed on the printer 436, and the user may enter the distance between prints on the pipe 448.

FIGS. 21-34 illustrate a pipe-laying trailer 510 according to another embodiment of the invention. The trailer 510 is generally the same as the trailer 210 of the third embodiment described above. Therefore, equivalent parts of the trailer 210 will be numbered the same, plus 300.

Figure 21:
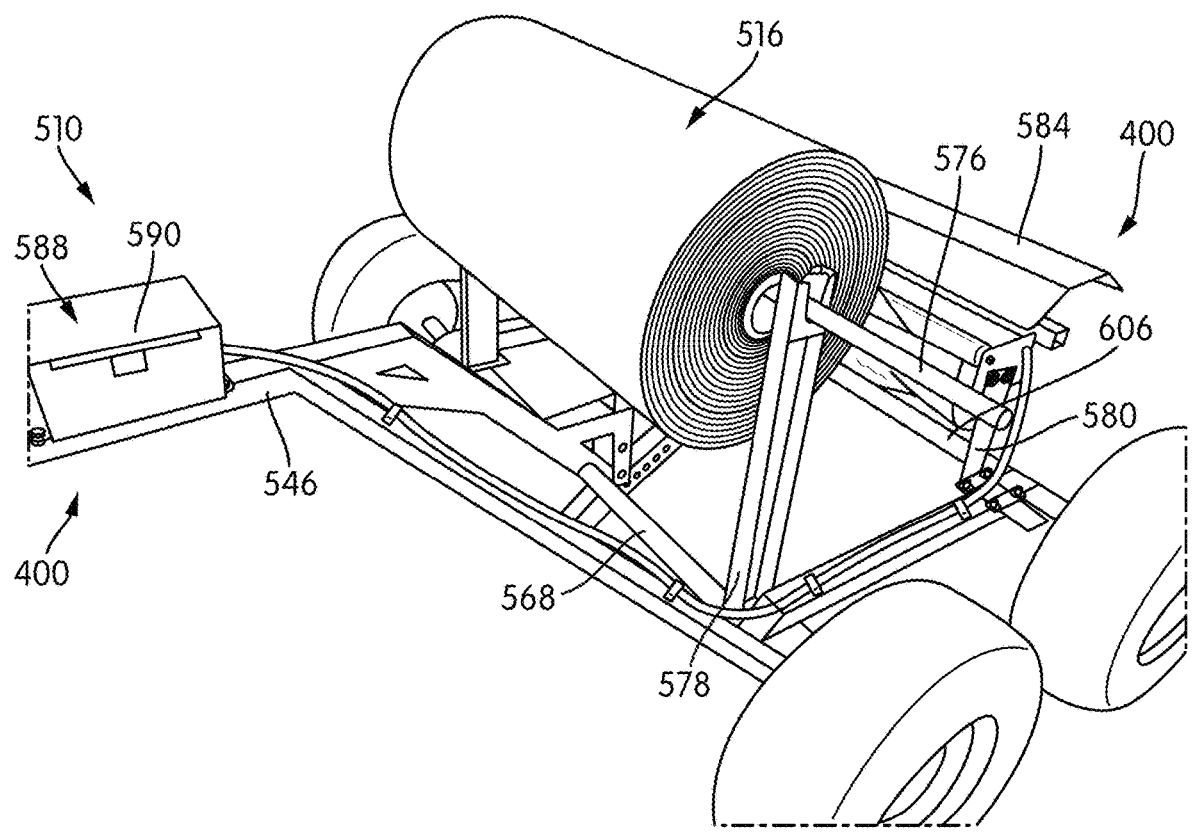
FIG. 21 is a perspective view of a trailer according to another embodiment of the present invention.

As illustrated in FIG. 21, the trailer 510 includes a first axle housing 568 and a second axle housing 606 that is separated from the first axle housing 568. At least one first support post 578 extends from the first axle housing 606, and at least one second support post 580 extends from the second axle housing 606. The first support post 578 supports a spindle 576. A roll of lay-flat pipe 516 is disposed about the spindle 576. The second support post 580 supports a shield 584, as well as at least a portion of the printer 436 and the system 400 described above.

Figure 22:
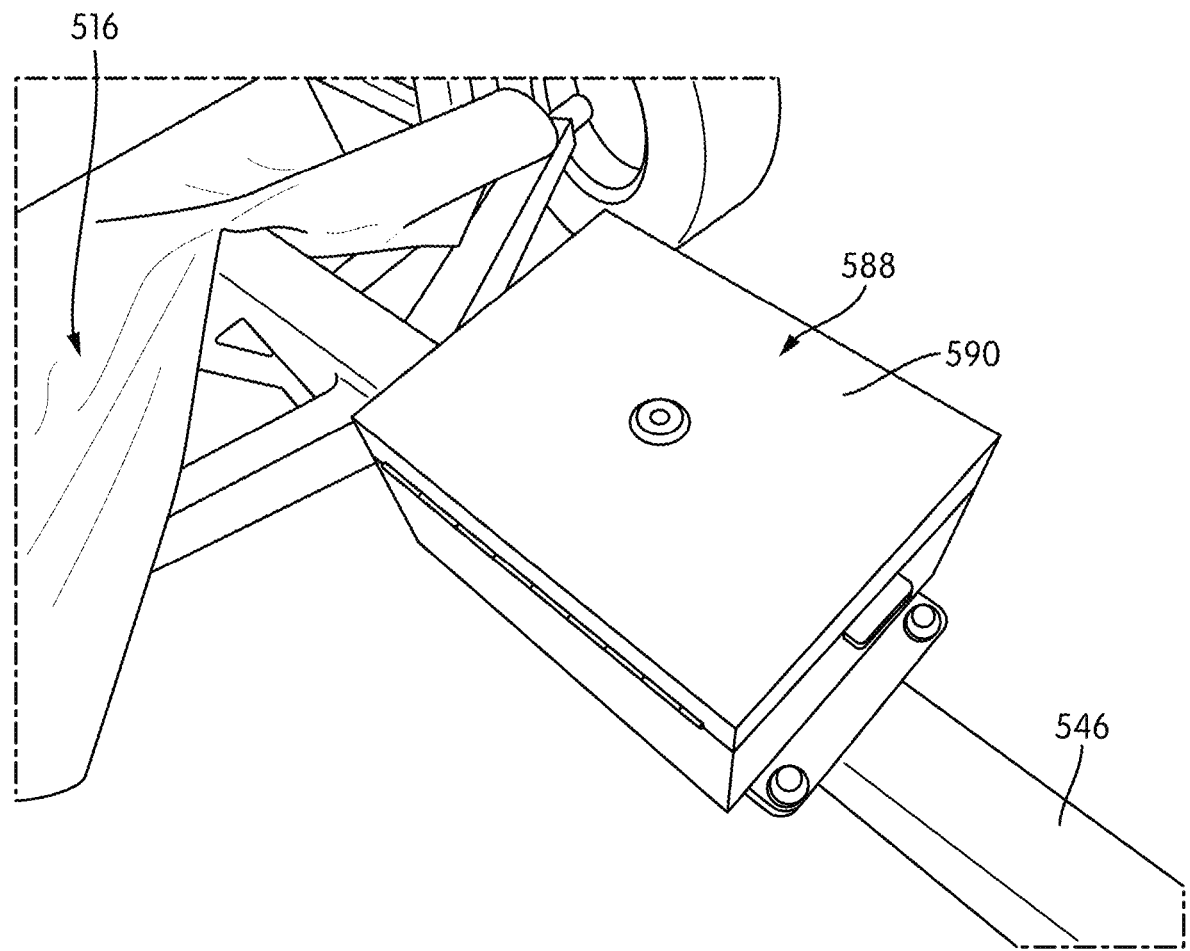
FIG. 22 is a partial view of the trailer of FIG. 21, illustrating an electronics housing.
Figure 23:
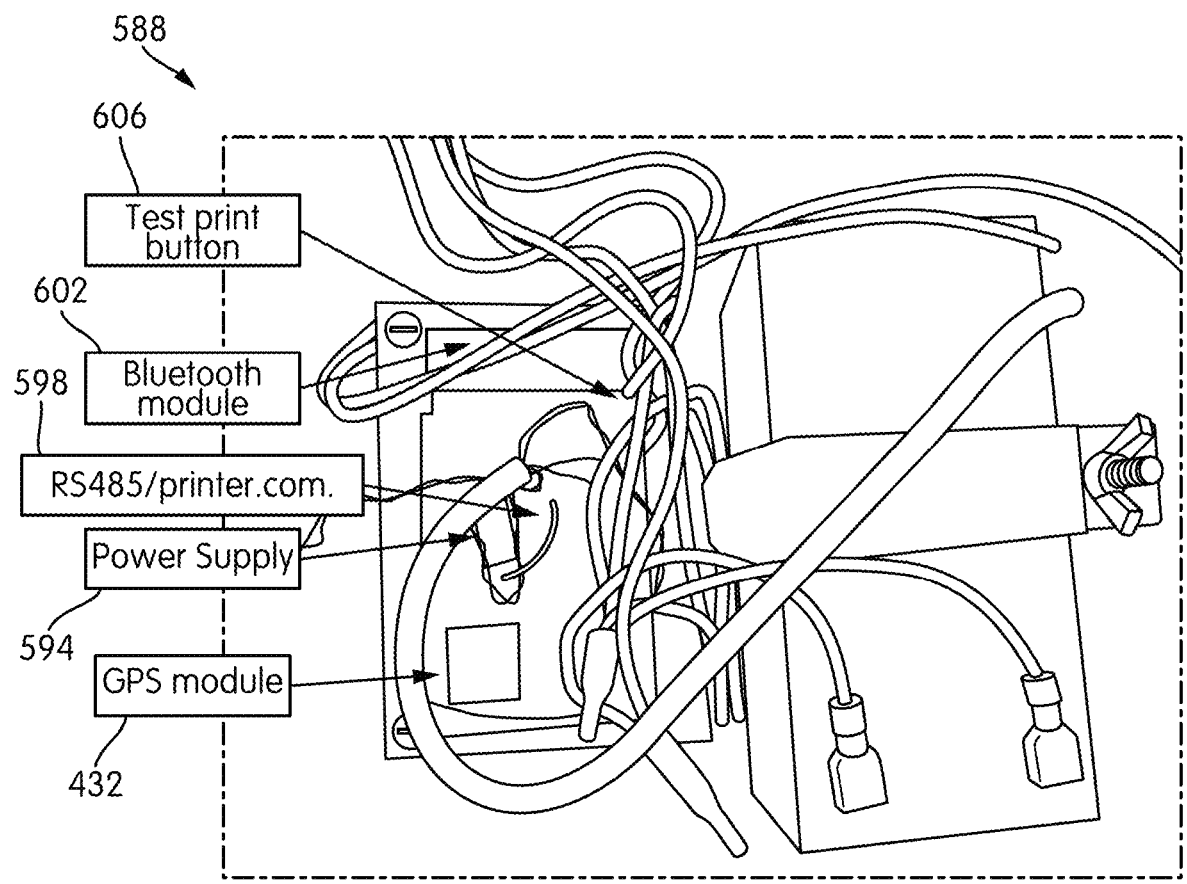
FIG. 23 is a perspective view inside the electronics housing.
Figure 24:
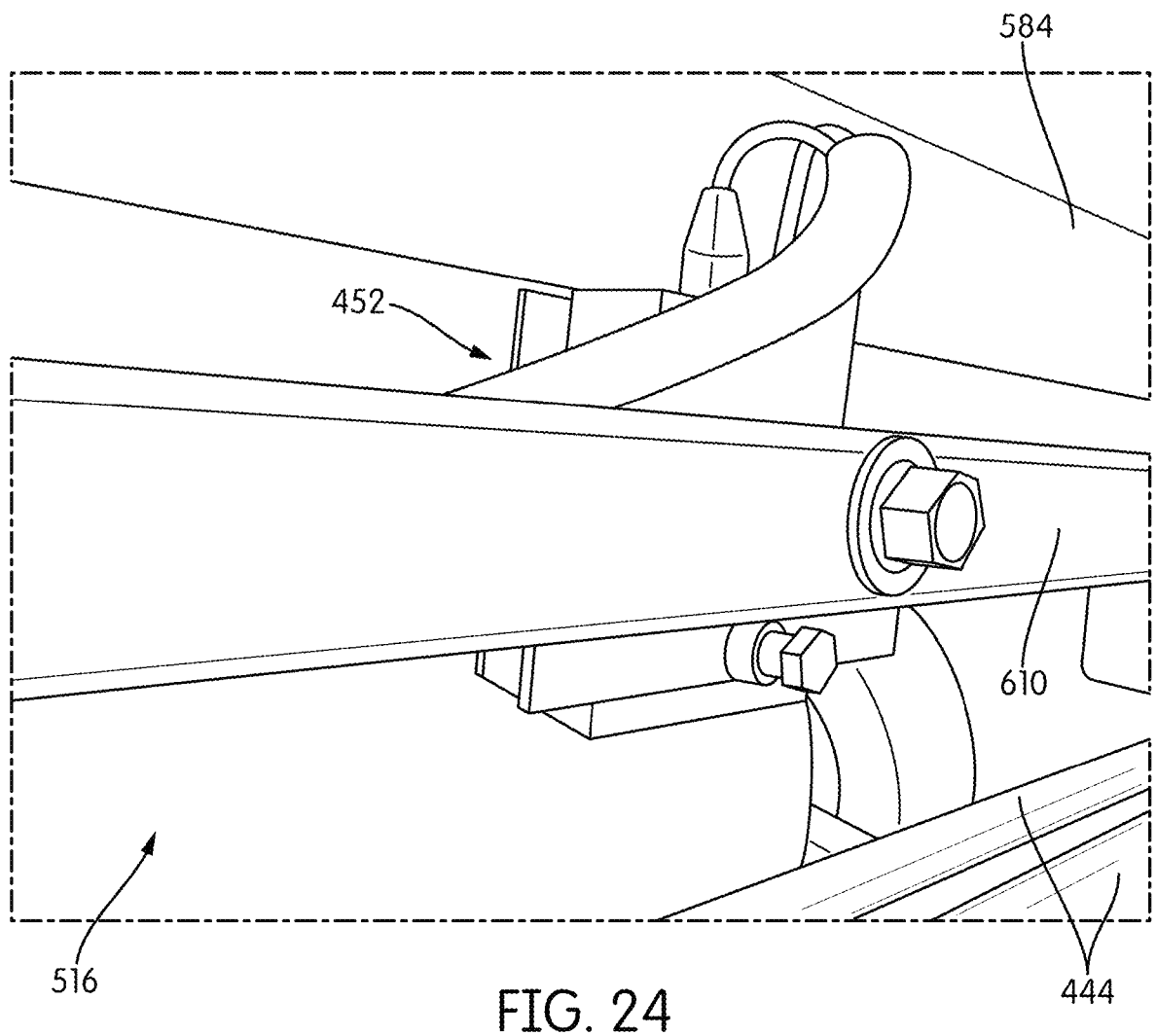
FIGS. 24-28 are perspective views of a printer of the trailer of FIG. 21.
Figure 25:
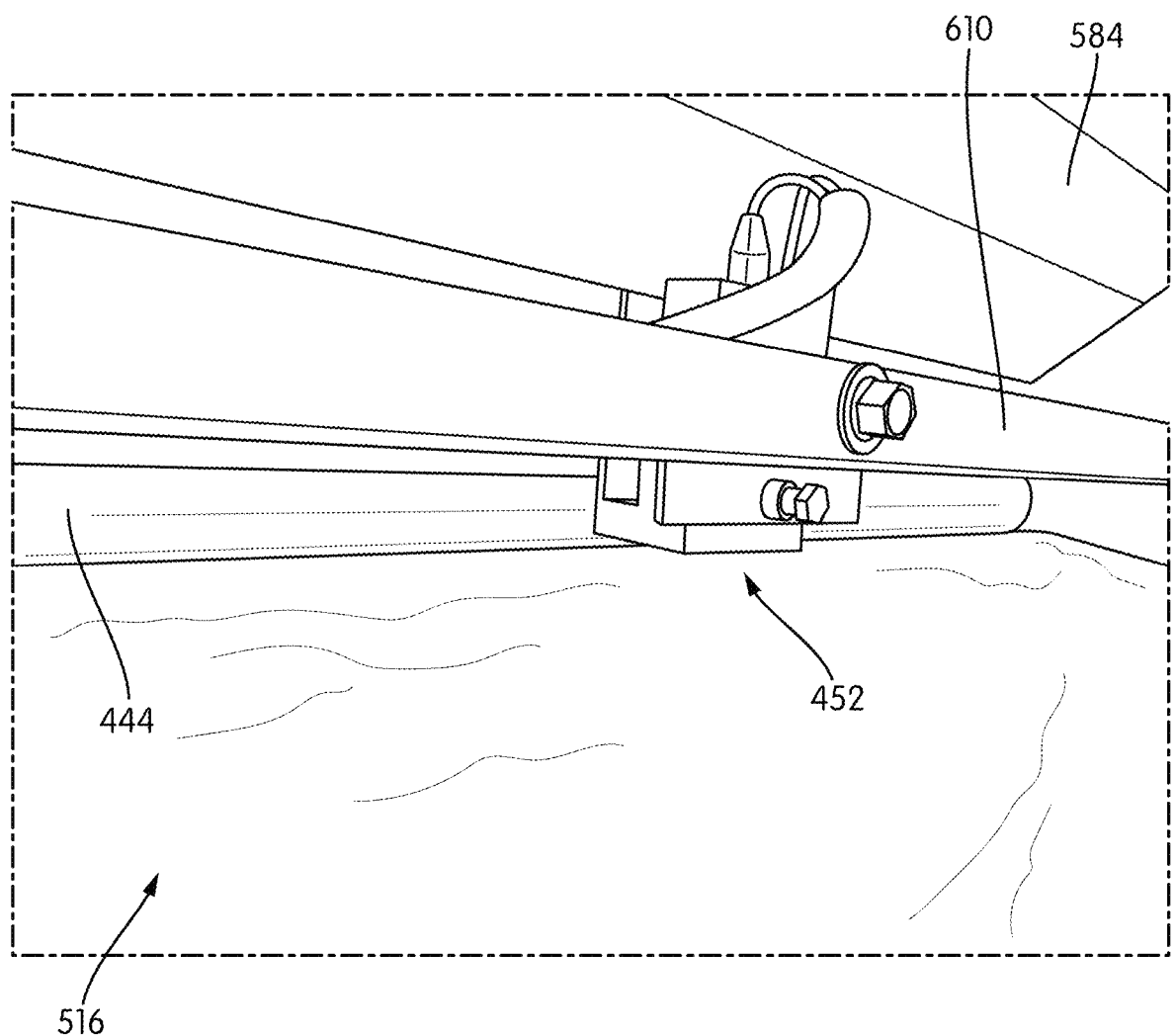

As illustrated in FIGS. 21-23, in the illustrated embodiment the system 400 includes an electronics housing 588 coupled (e.g., mounted) to an upper support member 546. The electronics housing 588 includes a hinged cover 590. With reference to FIG. 23, when the cover 590 is open, a plurality of system electronics are exposed, including the GPS 432 described above, as well as a power supply 594, an RS485/printer com. 598, a Bluetooth® module 602, and a test print button 606. Other embodiments include different electronics than that illustrated.

Figure 26:
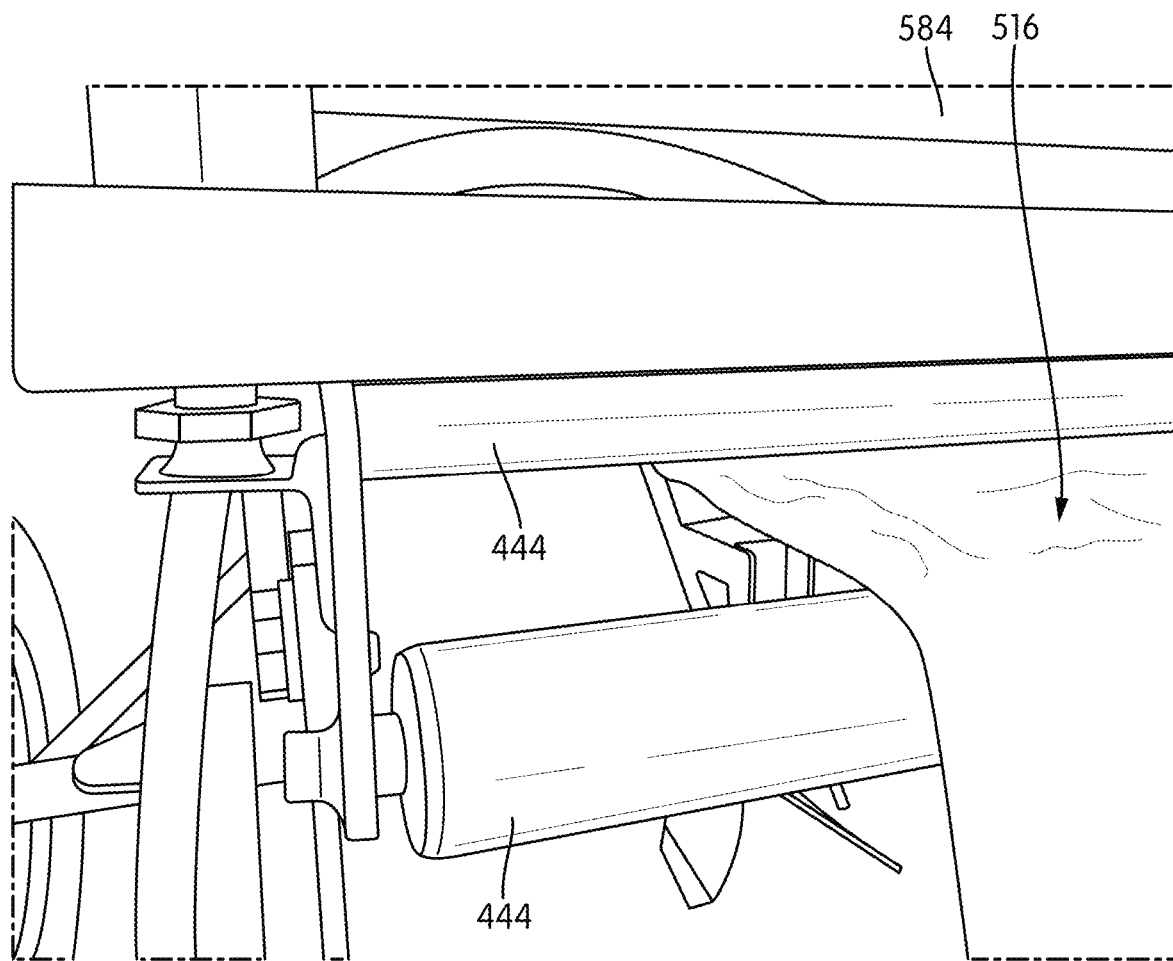
Figure 27:
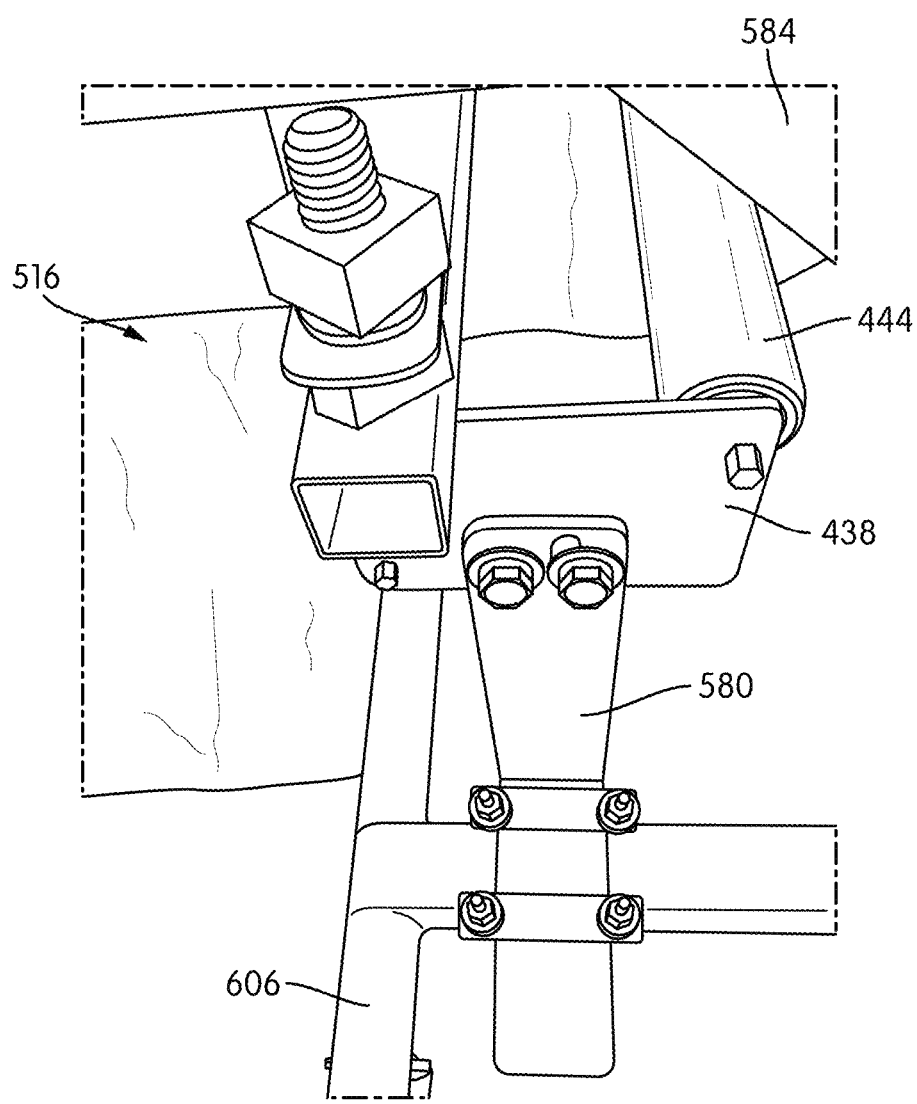
Figure 28:
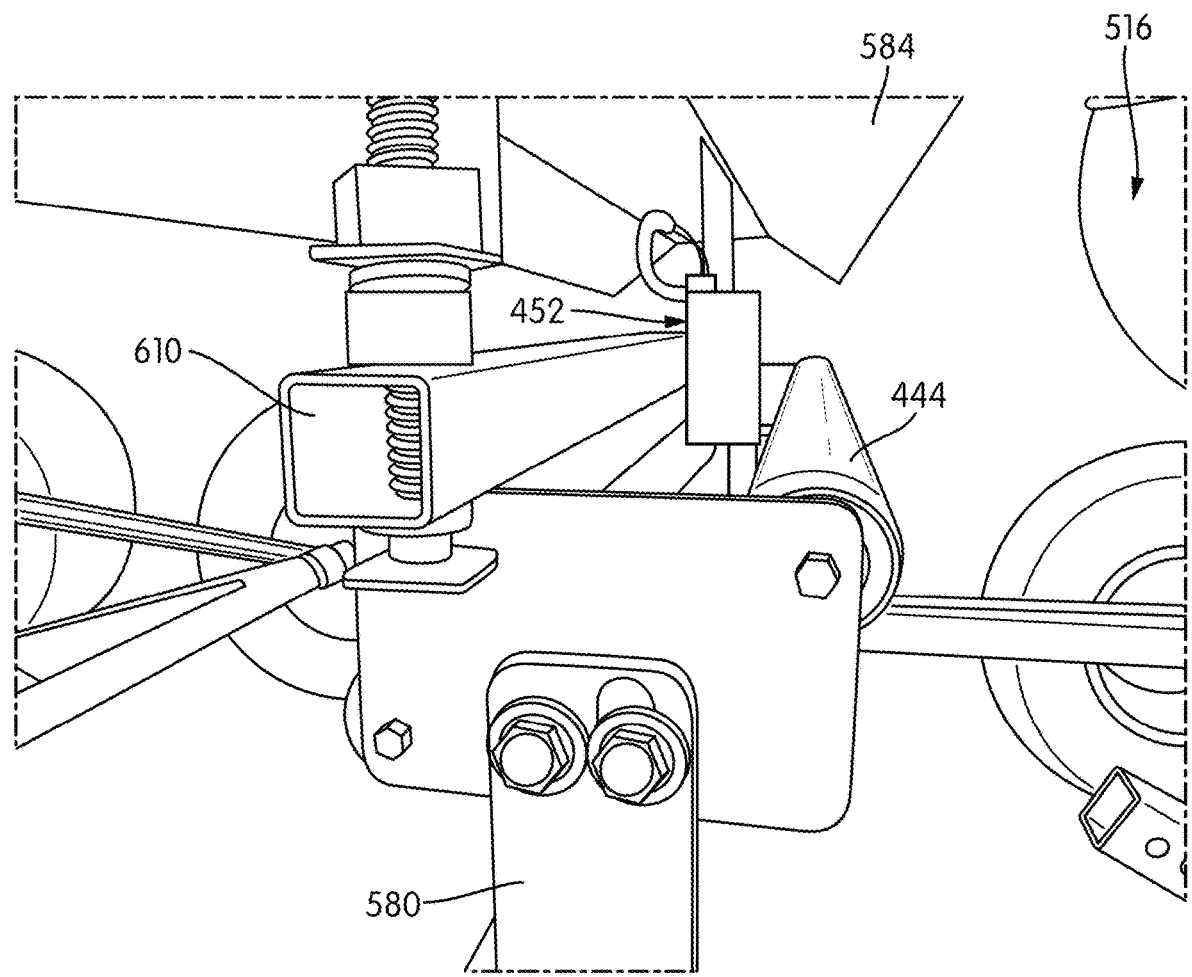

With reference to FIGS. 24-28, the ink jet printer module 452 is mounted directly below the shield 584 on a frame portion 610, such that the ink jet printer module 452 is shielded from damage and from the outside environment. The ink jet printer module 452 is also positioned generally adjacent the rollers 444, although other embodiments include different locations for the ink jet printer module 452. The ink jet printer module 452 is coupled to the electronics housing 588 (e.g., via a wired cable connection as illustrated, or wirelessly). As illustrated in FIG. 26, as the lay-flat pipe 516 is printed, the rollers 444 keep the lay-flat pipe 516 taut. In some embodiments the rollers 444 are adjustable, such that a distance between the rollers 444 (e.g., a height, a lateral distance, etc.) may be changed as desired. In some embodiments at least a portion of the printer 436 (e.g., a framing 438 supporting the rollers 444 as illustrated in FIG. 27) may be tilted to keep the lay-flat pipe 516 in contact with the rollers 444.

Figure 29:
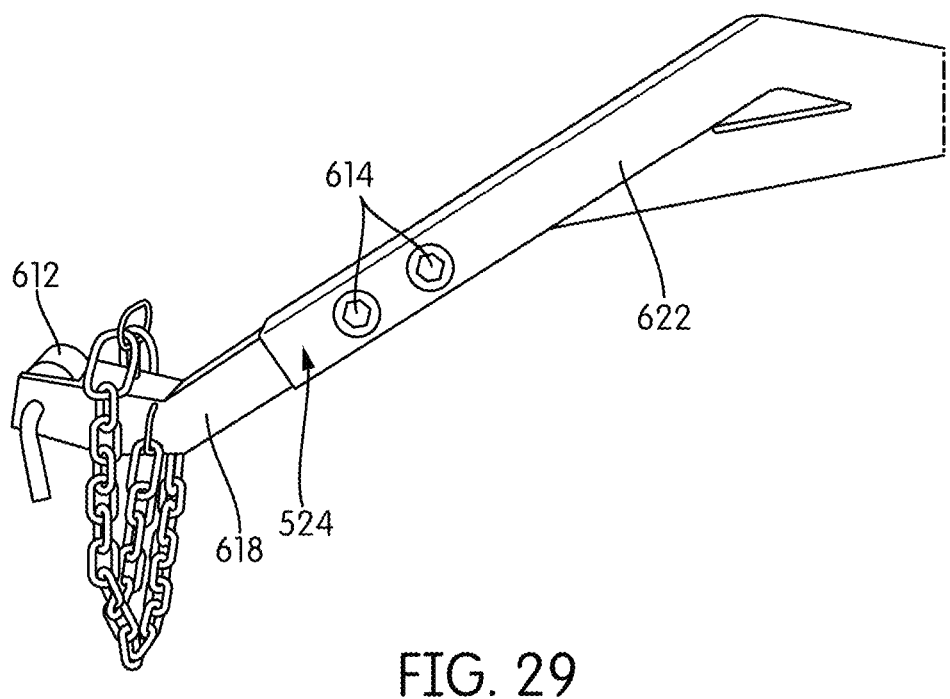
FIGS. 29 and 30 are perspective view of a hitch of the trailer of FIG. 21.
Figure 30:
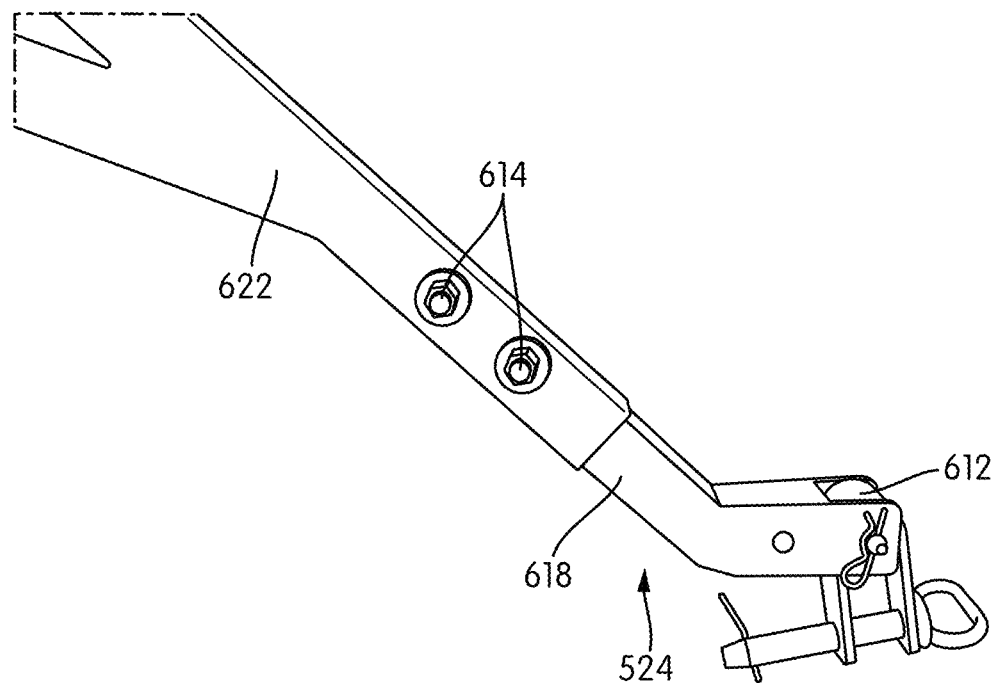

With reference to FIGS. 29 and 30, the trailer 510 includes a hitch assembly 524. In some embodiments at least a portion 612 of the hitch assembly 524 is configured to swivel to allow the vehicle (e.g., all-terrain vehicle, tractor, etc.) and the trailer 510 to stay connected without causing stress on the hitch of the vehicle. In some embodiments the hitch assembly 524 also, or alternatively, includes two bolts 614 or other structures that permit at least a first portion 618 of the hitch assembly 524 to telescope relative to a second portion 622 of the hitch assembly 524, and to thereby adjust to a size of the vehicle (some vehicle being higher or lower than others). In some embodiments, adjustment is made so that the rear axle (i.e., corresponding to the second axle housing 606) only contacts the ground upon hitting a backside of a levee.

Figure 31:
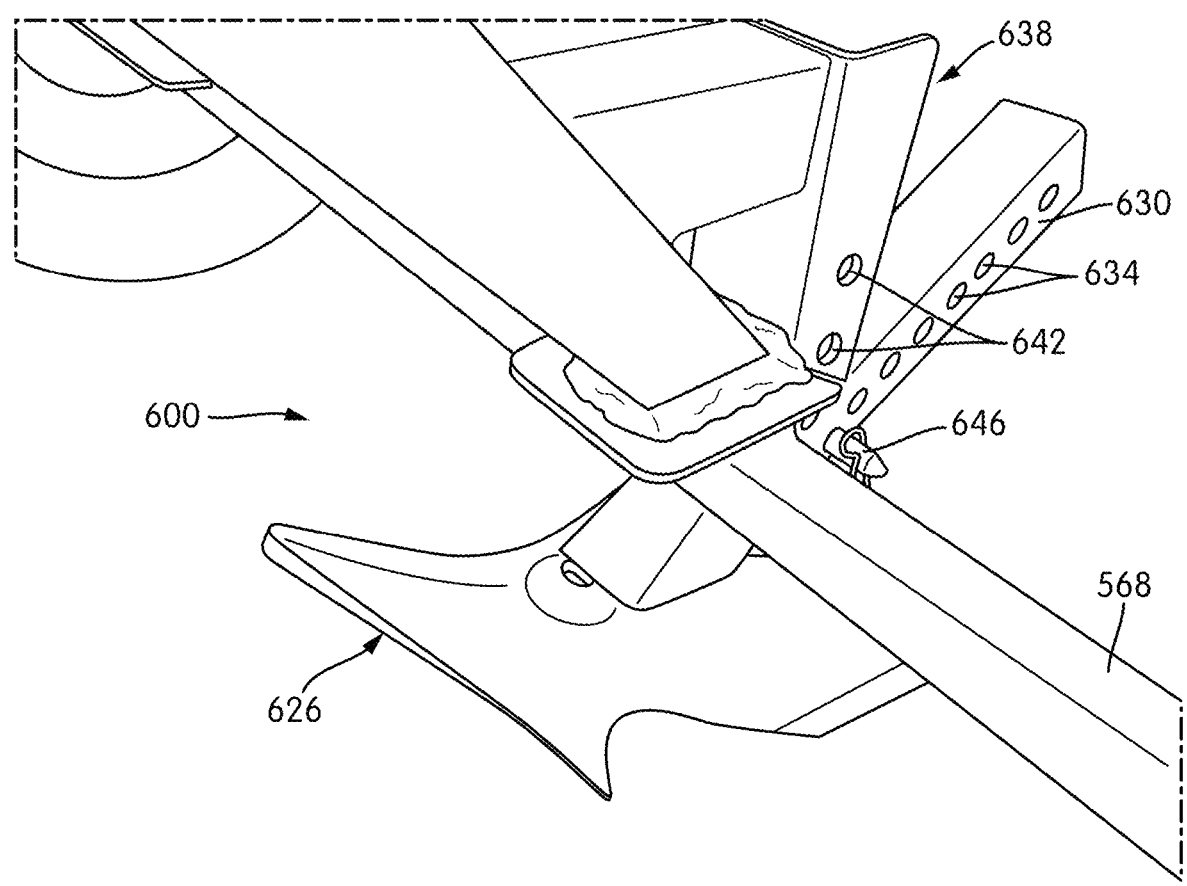
FIGS. 31-33 are perspective views of a furrow assembly of the trailer of FIG. 21.
Figure 32:
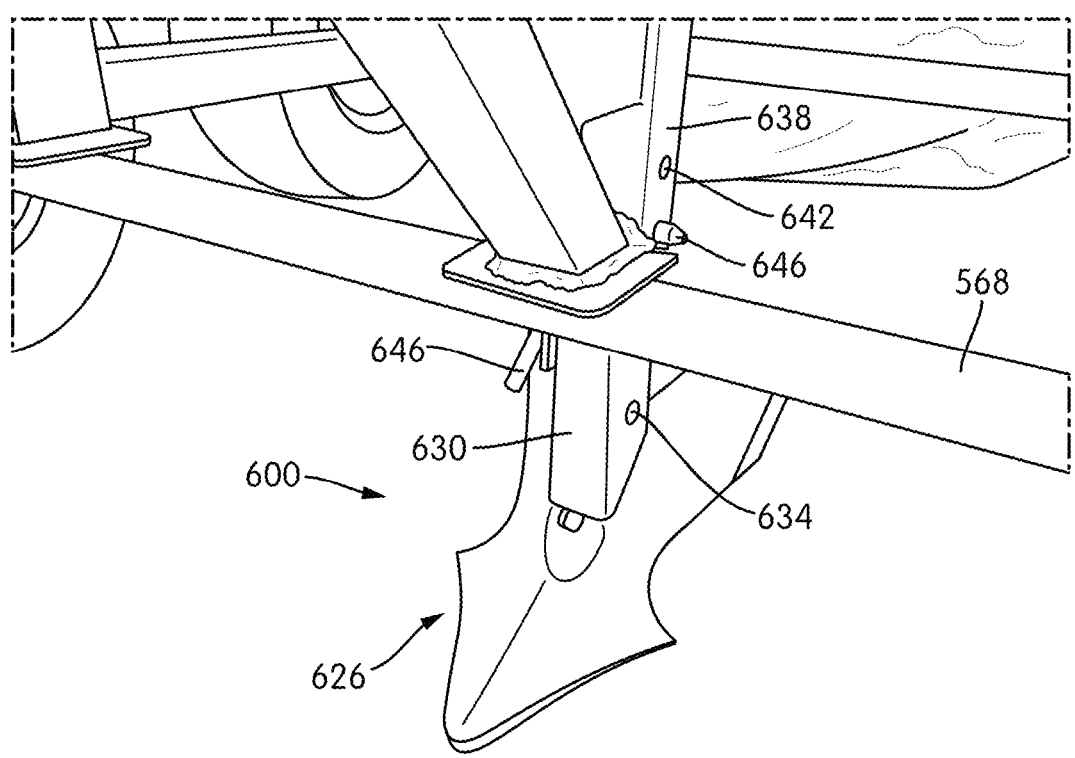
Figure 33:
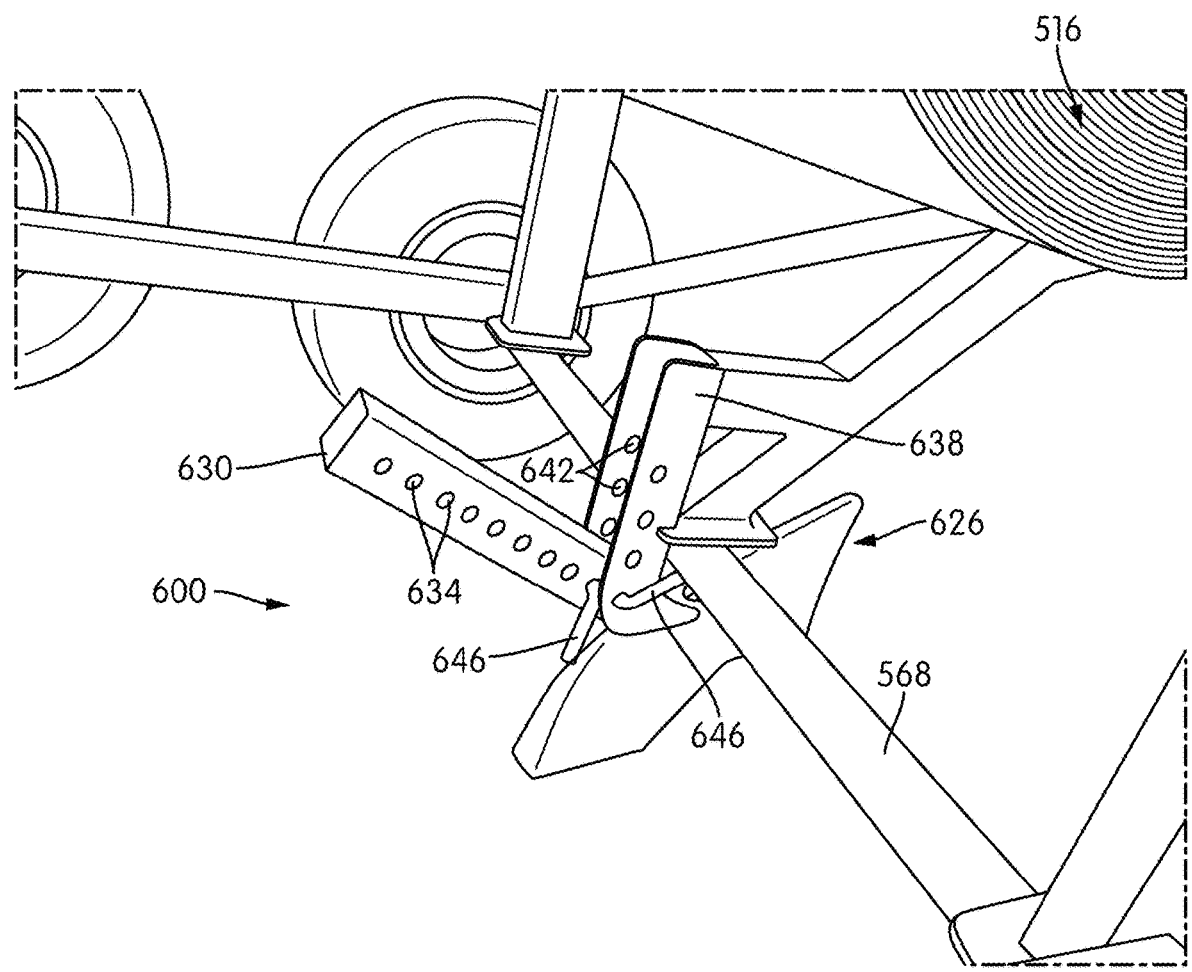

With reference to FIGS. 31-33, the trailer 510 includes a furrow assembly 600 having a plow 626. The plow 626 is sized and shaped to cut through soil and create a furrow in a field. The lay-flat pipe 516 is then laid within the furrow. The plow 626 includes an elongate arm 630 having a first plurality of openings 634. The trailer 510 includes a frame member 638 having a second plurality of openings 642. At least one pin 646 or other structure is provided to extend through at least one of the first plurality of openings 634 and/or one of the second plurality of openings 642 to lock a position the plow 626 (e.g., to lock a depth). In the illustrated embodiment, two pins 646 are provided (FIG. 33). Other embodiments include plows 626 having shapes and sizes other than that illustrated, as well as different structures by which to adjust a position of the plow 626. Additionally, while the furrow assembly 600 is illustrated as being positioned generally at the first axle housing 568, in other embodiments the plow 626 may be positioned at other locations (e.g., slightly forward or rearward of the first axle housing 568).

FIG. 31 illustrates the plow 626 in a travel position, when the plow 626 is not being used to install the lay-flat pipe 516. As noted above, a depth of the plow 626 may be adjusted by selecting a particular combination of the first and second plurality of openings 634, 642. When the plow 626 is not needed, the plow 626 may be raised and the pins 646 inserted. When the plow 626 is needed, one or more of the pins 646 may be removed and/or reinserted into a different opening 634, 642. FIG. 32 illustrates the plow 626 in a down position, when the plow 626 is being used to install the lay-flat pip 516.

Figure 34:
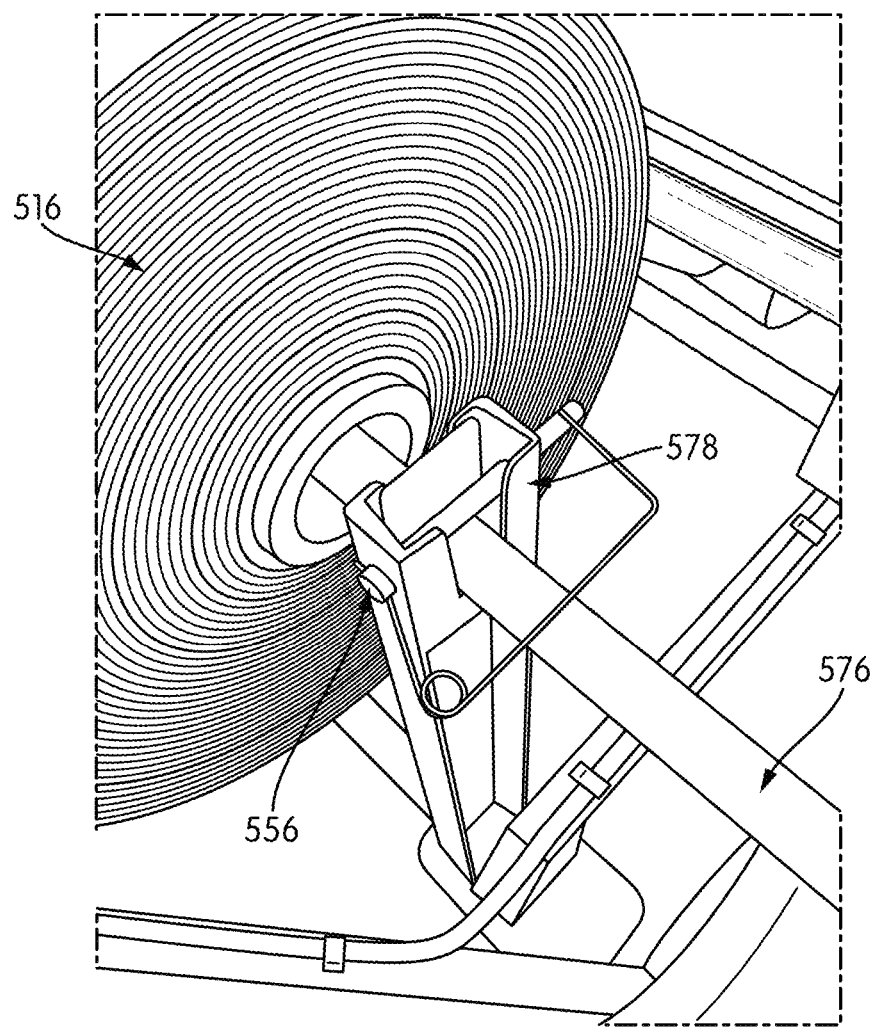
FIG. 34 is a perspective view of a spindle and pin of the trailer of FIG. 21.

With reference to FIG. 34, and as described above, the roll of pipe 516 is disposed about the spindle 576. In the illustrated embodiment, a pin 556 is coupled to the support post 578. The pin 556 retains the spindle 576. In other embodiments a spring-loaded hooked-shaped latch is used in place of the pin 556. Other embodiments include other structures to retain the spindle 576.

Various features and advantages of the invention are set forth in the following claims.

What is claimed is:

1. A trailer for laying a roll of pipe in a field, the trailer comprising:
   a hitch assembly positioned at a first end of the trailer, wherein the hitch assembly couples the trailer to a vehicle;
   a distribution assembly connected to a second end of the trailer, the distribution assembly including a spindle to support the roll of pipe;
   a gooseneck frame including a first end connected to the hitch assembly, a second end connected to the distribution assembly, and a member between the first end of the gooseneck frame and the second end of the gooseneck frame, wherein the member is elevated relative to the hitch assembly; and
   a punch plan system and printer supported by the trailer.

2. The trailer according to claim 1, the trailer further comprising a first set of wheels coupled to the second end of the trailer.

3. The trailer according to claim 2, the trailer further comprising
   a second set of wheels coupled to the second end of the trailer and spaced from the first set of wheels, and
   a furrow assembly positioned between the first set of wheels and the second set of wheels, wherein the furrow assembly is configured to form a furrow in the field to receive the pipe.

4. The trailer according to claim 3, wherein the first set of wheels are positioned lower than the second set of wheels.

5. The trailer according to claim 3, further comprising a first axle supporting the first set of wheels and a second axle supporting the second set of wheels, and wherein the first axle is lower to the ground than the second axle.

6. The trailer according to claim 2, wherein the distribution assembly includes a first arm and a second arm that extend upwardly from the gooseneck frame, wherein the first arm and the second arm configured to the support the spindle.

7. The trailer according to claim 1, wherein the hitch assembly includes a round bar for coupling to a U-shaped hitch.

8. The trailer according to claim 1, wherein the hitch assembly provides for about 140 degrees of movement relative to a horizontal plane running through the hitch assembly.

9. The trailer according to claim 1, wherein the hitch assembly pivots about 70 degrees and about −70 degrees relative to a horizontal plane running through the hitch assembly.

10. The trailer according to claim 1, wherein the printer prints a punch plan on the pipe.

11. A printed punch plan system comprising:
    an electronic processor configured to receive a computerized hole selection plan;
    a printer; and
    a global positioning system coupled to the printer to locate the printer relative to a field, the printer in communication with the electronic processor and configured to receive instructions for printing information on lay flat pipe based on the computerized hole selection plan and where the printer is located.

12. The printed punch plan system of claim 11, further comprising a memory and a software program stored in the memory, wherein the software program is configured to be accessed to execute instructions related to generating the computerized hole selection plan.

13. The printed punch plan system of claim 11, further comprising a user interface having a touchscreen and a graphical user interface displayed on the touchscreen that includes selectable menus, selectable icons, and areas to receive inputs relating to parameters of the computerized hole selection plan.

14. The printed punch plan system of claim 11, further comprising a transceiver, wherein the system is configured to connect to and communicate with a network through the transceiver, wherein the network includes a wide area network.

15. The printed punch plan system of claim 11, further comprising a memory, a transceiver, and a user device, wherein the memory is communicatively coupled to the transceiver for further communication with the user device.

16. The printed punch plan system of claim 15, wherein the user device is a handheld device.

17. The printed punch plan system of claim 11, wherein the global positioning system is configured to update a location data of the printer at a predetermined frequency.

18. The printed punch plan system of claim 11, wherein the printer includes two rollers that support the lay flat pipe, and an ink jet printer module mounted between the rollers configured to ink the computerized hole selection plan.

19. The printed punch plan system of claim 11, wherein the global positioning system is configured to provide location data of the printer that includes GPS coordinates of the printer and a speed of movement of the printer, and wherein the global positioning system is configured to update the location data at a predetermined frequency.

* * * * *